(12) United States Patent  
Sommer

(10) Patent No.: US 7,975,958 B2
(45) Date of Patent: Jul. 12, 2011

(54) MODULAR ARTICULATED-WING AIRCRAFT

(76) Inventor: Geoffrey S. Sommer, Arlington, VA (US)

( * ) Notice: Subject to any disclaimer, the term of this patent is extended or adjusted under 35 U.S.C. 154(b) by 17 days.

(21) Appl. No.: 12/805,434

(22) Filed: Jul. 30, 2010

(65) Prior Publication Data

US 2011/0144834 A1  Jun. 16, 2011

Related U.S. Application Data

(63) Continuation of application No. 11/475,085, filed on Jun. 27, 2006, now Pat. No. 7,789,339.

(60) Provisional application No. 60/697,497, filed on Jul. 7, 2005.

(51) Int. Cl.
*B64D 5/00* (2006.01)

(52) U.S. Cl. .................. 244/3; 244/117 R; 244/131
(58) Field of Classification Search ............... 244/117 R, 244/131, 137.4, 2, 63, 3; 258/1.2
See application file for complete search history.

(56) References Cited

U.S. PATENT DOCUMENTS

| | | | |
|---|---|---|---|
| 2,496,087 A | 1/1950 | Fleming | |
| 2,863,618 A | 12/1958 | Doyle et al. | |
| 2,969,933 A | 1/1961 | Vogt | |
| 3,161,373 A | 12/1964 | Vogt | |
| 3,226,056 A | 12/1965 | Holland, Jr. | |
| 3,249,322 A | 5/1966 | Holland, Jr. | |
| 5,503,350 A | 4/1996 | Foote | |
| 5,810,284 A | 9/1998 | Hibbs et al. | |
| 6,641,082 B2 * | 11/2003 | Bevilaqua et al. | 244/2 |
| 7,281,681 B2 | 10/2007 | MacCready et al. | |
| 7,357,352 B2 | 4/2008 | Speer et al. | |
| 2005/0118952 A1 | 6/2005 | Cox et al. | |

OTHER PUBLICATIONS

International Search Report (ISR) mailed Jul. 22, 2008 and Written Opinion of the International Searching Authority mailed Jul. 22, 2008 for corresponding foreign application (PCT/US06/25269).
Definition for "array" from www.dictionary.com.
Definition for "hinge" from www.merriam-webster.com.

* cited by examiner

*Primary Examiner* — Benjamin P Lee
(74) *Attorney, Agent, or Firm* — Nixon & Vanderhye PC

(57) ABSTRACT

Systems and/or methods for forming a multiple-articulated flying system (skybase) having a high aspect ratio wing platform, operable to loiter over an area of interest at a high altitude are provided. In certain exemplary embodiments, autonomous modular flyers join together in a wingtip-to-wingtip manner. Such modular flyers may derive their power from insolation. The autonomous flyers may include sensors which operate individually, or collectively after a skybase is formed. The skybase preferably may be aggregated, disaggregated, and/or re-aggregated as called for by the prevailing conditions. Thus, it may be possible to provide a "forever-on-station" aircraft.

23 Claims, 21 Drawing Sheets

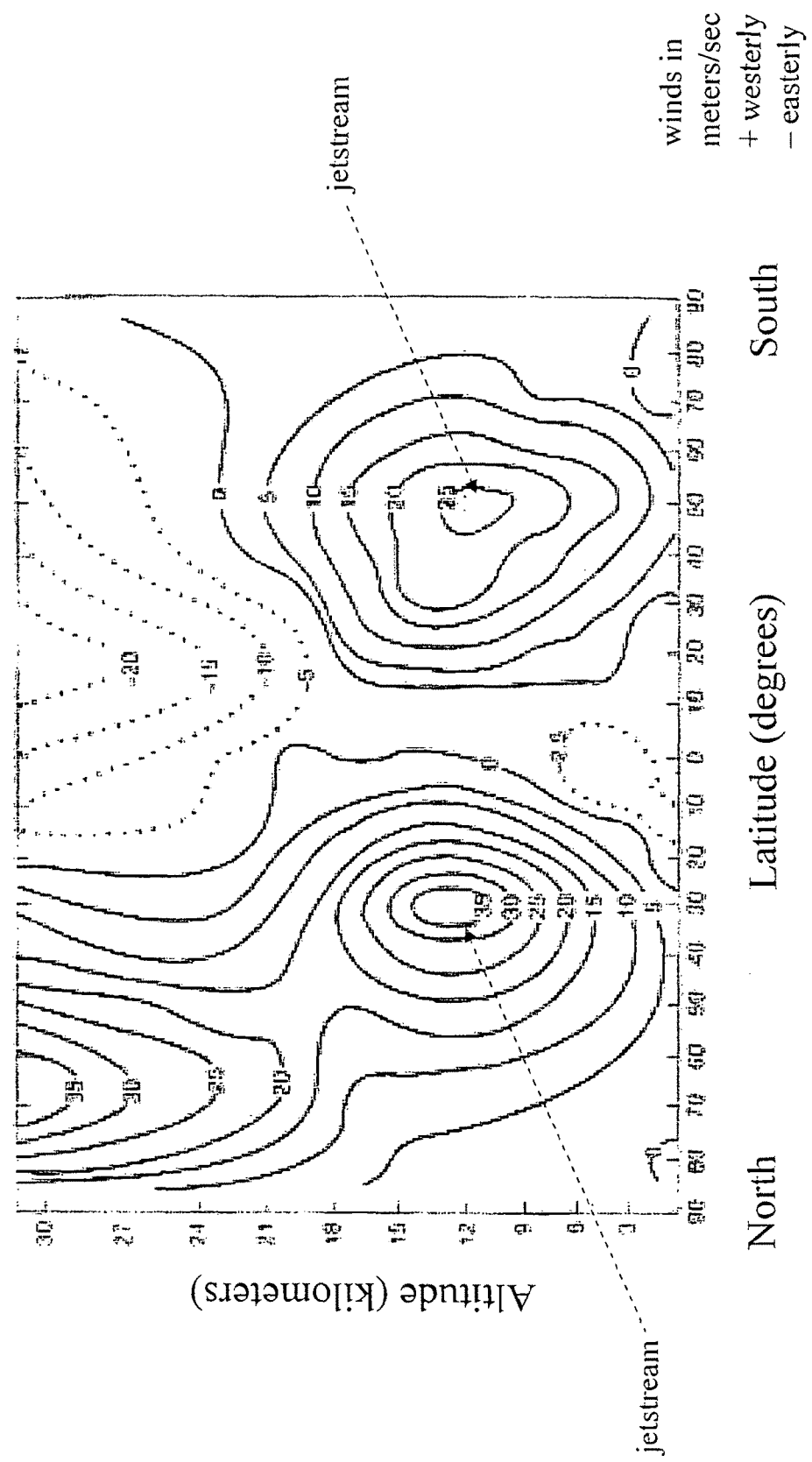

MODULAR ARTICULATED-WING AIRCRAFT

CROSS-REFERENCE TO RELATED APPLICATION

This application is a continuation of U.S. patent application Ser. No. 11/475,085, filed Jun. 27, 2006, now U.S. Pat. No. 7,789,339 that application claims the benefit of Application Ser. No. 60/697,497, filed Jul. 7, 2005, the entire contents of which are incorporated herein by reference.

FIELD

The exemplary embodiments herein relate to high altitude aircraft flights. More particularly, the exemplary embodiments herein provide a means of attaining a very high aspect ratio wing platform with a lower structural weight than is achievable with existing designs. This lower weight allows both a higher ceiling and longer endurance at higher altitudes than would otherwise be possible. Additionally, the modular nature of the exemplary embodiments provides greatly increased operational flexibility and system robustness.

BACKGROUND AND SUMMARY

For many military and commercial missions it is desirable to fly an aircraft at very high altitude, ideally with the capability to stay on station indefinitely. The missions that benefit from this capability are those that take advantage of the long line-of-sight to the horizon enjoyed by such a high altitude platform. Missions with both military and commercial utility include surveillance and communications connectivity. A high altitude, long endurance aircraft also has application to the military signals intelligence mission. Finally, a high altitude, long endurance aircraft has application to space exploration, inasmuch as such a vehicle can be flown in any type of planetary atmosphere. An aerodynamic design that can operate at the very top of the Earth's atmosphere is naturally well-suited to flying at a lower altitude on a world with low atmospheric density at the planetary surface.

Alternatives to high altitude, long endurance aircraft include orbiting satellites and those aircraft that can achieve high altitude but without the capability for long endurance at that altitude. Both of these alternatives have operational and cost disadvantages. Satellites are expensive to launch and operate and, except in the case of geostationary satellites, cannot loiter over a point on the ground. Consequently, large constellations of satellites are required for global coverage or to ensure high revisit rates (i.e. short gaps in coverage) with respect to a ground target or ground station. Geostationary satellites remain fixed with respect to a location on the ground only when launched into an orbital slot above the equator, which drastically limits ground coverage, especially at high latitudes. Finally, aircraft without long endurance at high altitudes have inefficiencies of operation, owing to the need to cycle such vehicles back and forth from a launch base to a mission station (e.g. the locus of the surveillance, communication, or other mission activities in question). For example, at any given time one aircraft might be flying to relieve a second aircraft on-station, while a third is flying back to the launch base from the station, and a fourth is at the launch base being prepared for takeoff. The required fleet size, and thus the overall cost, increases with the distance of the mission station from the launch base. Furthermore, along the entire flight path of the cycling aircraft, the operation becomes subject to the vagaries of nature (e.g. storms) and, in the military case, enemy action, etc.

As a result of the cost and operational disadvantages of alternatives, a viable high altitude long endurance aircraft has become something of a holy grail for aircraft designers. Furthermore, for reasons of operational responsiveness, it is desirable that such an aircraft be rapidly deployable to a distant operating location without being impeded by adverse weather conditions. Satisfying these requirements with one design is an extremely difficult technical challenge.

For reasons of less-than-perfect subsystem reliability, no high altitude long endurance aircraft that could operate on-station indefinitely has heretofore been conceived. In the past, it has been recognized that it is possible to design aircraft, the endurance limits of which are not bounded by the supply and consumption of onboard fuel. Such an aircraft could maintain a mission station at an altitude for perhaps several months, until subsystem failures forced a return to base. There are three general cases: nuclear propulsion using an onboard nuclear fission reactor, power beamed to the aircraft from the ground (e.g., using microwaves or laser energy), and solar-electric propulsion.

The United States explored nuclear-powered aircraft in the 1950s, but the effort that involved a modified Convair B-36 Peacemaker test-bed aircraft and ground-based test articles was terminated. It is highly unlikely that contemporary environmental awareness and political sensitivities would allow a similar concept to be pursued today.

Small remote-controlled aircraft that are powered by means of energy beamed from a ground site have been designed and, in some cases, flown. Effectiveness is limited by very poor efficiencies when distance from the ground site becomes large, as a consequence of beam spreading and the resulting reduced energy flux received by the aircraft. Furthermore, if beam spreading is minimized by resorting to higher frequencies of energy transmission, flux is improved at the cost of increased environmental risk (e.g. birds and other aircraft may fly through the beam at intermediate altitudes). The practical result of these limitations is that the beam-powered aircraft is virtually tethered close to its source of power, which is operationally undesirable in most cases.

Solar-electric propulsion is the third pathway to effectively unlimited flight and, in fact, full-scale unmanned and manned solar-electric airplanes have been flown. Examples include the Aerovironment Pathfinder and Helios. Reliance on solar flux causes solar-electric aircraft designs to have very low propulsive power, which in turn places a premium on aerodynamic and structural design. Furthermore, such aircraft are best operated at very high altitude, ideally more than 50,000 feet above sea level, to ensure that clouds do not reduce received solar flux and to minimize the chance of encountering headwinds.

As a result of these considerations, current efforts to achieve a "forever on-station" high altitude aircraft have largely focused on solar-electric aircraft. There are two types of aircraft under consideration: heavier-than-air aircraft (e.g. airplanes) and lighter-than-air aircraft (e.g. airships). Airships derive their lift from aerostatic means (e.g. from a buoyant force provided by a lifting gas such as helium) rather than from aerodynamic forces acting on a wing. A solar-electric airship currently under development is the Lockheed-Martin High Altitude Airship.

In both airplane and airship cases, the combination of low power (which is due to the limits of solar flux) and high altitude results in the need for very large, lightweight structures. In the airplane case, wing loading (i.e. the ratio of airplane weight to wing area) must be very low. In the airship case, hull fabric weight per surface area must be very low. Consequently, both airplanes and airships will be relatively fragile. Additionally, airspeeds of both types of vehicle will be very low due to the low power that is available. These aircraft are consequently at risk of catastrophic structural failure or being blown uncontrollably downwind, as a result of gusts or high winds respectively, while climbing or descending through the lower atmosphere or while being launched.

The most efficient aerodynamic configuration in terms of lift-to-drag ratio for a high altitude solar-electric aircraft is that of a high aspect ratio unswept flying wing, where aspect ratio is defined as the square of wing span divided by reference wing area. "Flying wing" refers to an airplane that is comprised of a wing alone, without fuselage or empennage. This was, in fact, the configuration of the Aerovironment Pathfinder and Helios aircraft. The primary aerodynamic disadvantage of such a configuration is that stability and control are inherently poor, especially in the longitudinal or pitch sense, since with no tail surfaces there can be no significant tail moment arm. The primary structural disadvantage of the lightweight, high aspect ratio flying wing configuration is that there can be little resistance to span-wise bending and little torsional stiffness (i.e. resistance to wing twisting). In particular, in the solar-electric case, there is no fuel carried in the wing, the weight of which would serve to react against the first wing bending moment. If payload is not distributed across the span of the wing (i.e. span-loaded) but is instead concentrated at the centerline of the vehicle, the problem of span-wise bending is aggravated. Finally, these aerodynamic and structural difficulties can combine in the form of aero-structural interactions—for example, the aircraft can develop wing flapping and twisting oscillations that cause uncontrollable and potentially divergent oscillations in flight path. This sequence of events was, in fact, the proximate cause of the in-flight breakup of the Aerovironment Helios over the Pacific Ocean in 2003.

Returning to the airship case, the lightweight fabrics required for high altitude airship flight are problematic. For reasons of weight, high altitude airships must be of non-rigid design, where hoop stresses and hull bending moments are carried by the hull fabric alone. Such fabrics must also resist tearing, resist ultraviolet radiation, and be very impermeable to helium. Historically, hull structural failure of airships operating at low altitude has been a recurring difficulty, and the requirement for lightweight fabrics at high altitude makes matters worse. Finally, to carry a reasonable payload, the high altitude airship must be extraordinarily large, on the order of 500 feet in length or more. This limits basing opportunities and introduces ground handling difficulties.

The exemplary embodiments described herein incorporate the premise that the technological and programmatic risks associated with high altitude airships are greater than those of high altitude airplanes, and proposes a solution for the aero-structural limitations of high aspect ratio flying wing airplanes. This solution entails subdivision of the wing into autonomous modular units that can join together in-flight, wingtip-to-wingtip, forming a single, multiple-articulated flying surface of great aerodynamic efficiency. A preferred embodiment includes a modular articulated-wing aircraft as above, with a solar-electric power system to provide motive force and satisfy mission system and housekeeping electrical demands.

There are in principle two ways of arranging low aspect ratio wing elements so as to approximate the aerodynamic efficiency of a higher aspect ratio wing. The first is, as above, to join the wing elements at the wingtips, creating an actual continuous wing surface. The second approach is to form a virtual wing, where wing elements are arranged in a chevron as seen from above, akin to the arrangement of a flock of geese flying in formation. In this latter case, aerodynamic benefits accrue from trailing wing elements being positioned precisely in the upwash of the element in front—in effect, the wing element is hitching a ride on the preceding element. In theory, the virtual wing approach can lead to impressive gains in aerodynamic efficiency, and since the wing elements are physically isolated there is no difficulty with wing bending. However, there are practical difficulties. The relative positions of wing elements must be very precisely controlled— the vorticity of airflow behind a wing means that a slight shift in lateral positioning can result in a wing element being in the downwash rather than upwash of the preceding element. There must be constant rotation in the positions of elements in the virtual wing, as the lead element gets no "free ride" and must periodically fall back, as does the lead goose in a flight of geese. Finally, and perhaps most seriously, aerodynamic modeling of such a virtual wing is difficult and the net aerodynamic benefits of the configuration currently are speculative.

The concept of aircraft joined at the wingtips to improve aerodynamic performance is not new. However, the prior art is restricted to aircraft of unequal sizes joined with the advantages of improving range and endurance rather than identically-sized aircraft joined with the advantage of attaining high altitude. Generally, small "hitchhiker" aircraft attach themselves to the wingtips of a much larger "mothership" aircraft (e.g. fighters attached to the wingtips of a bomber), enabling the hitchhikers to cover long distances that would otherwise be beyond their capability. Meanwhile, thanks to the aerodynamic advantage of an effectively higher aspect ratio wing, the mothership incurs little or no fuel consumption penalty.

The United States Air Force conducted flight tests of hitchhiker-mothership compound aircraft beginning in 1949. The objective was to demonstrate the capability for intercontinental bombers to be escorted for thousands of miles to their targets and back, and this was only possible if the fighters were carried or assisted by the bombers in some fashion. From 1949 to 1950, flight tests of a wingtip-linked Douglas C-47A transport and a Culver Q-14B trainer were conducted. These tests were promising, and were followed by tests of a Boeing B-29 Superfortress bomber linked at the wingtips to two Republic F-84 jet fighters in a project designated "Tip Tow." Unfortunately the B-29 and one of the F-84s were lost with all souls in 1953. An automatic flight control system whose purpose was to control flapping angle failed to function as expected, and the doomed F-84 rotated about the wingtip connection, impacting the wing of the B-29. Flapping angle is defined as the angle between the wings of two joined aircraft in the lateral direction.

Another Air Force tip-docking project designated "Tom Tom" was conducted from 1952 to 1953. The Tom Tom project flight tested a Convair B-36 Peacemaker bomber attached at the wingtips to two F-84 fighters. On a test flight in late 1953, an uncontrollable oscillation developed between the B-36 and one of the F-84s, and the B-36 suffered major damage to its wing. The F-84 returned to base with a large section of the B-36's wing structure still attached to its wingtip.

As a result of these difficulties, Projects Tip Tow and Tom Tom were cancelled, and the Air Force ceased further experimentation with tip-docking compound aircraft concepts. The technology of the time was deficient in a number of areas. It was difficult or impossible to analytically predict complex flow fields and the interactions of flexible, linked aero-structures. It was an enormous challenge to design the automatic flight control systems that were necessary for tip-linked operations. Note that the hitchhiker-mothership type of compound aircraft has inherent difficulties that are not a feature of compound aircraft comprising multiple, small, equal-sized flight elements. Specifically, the mothership is large and heavy relative to the hitchhikers, and consequently the hitchhikers contend with very strong trailing wingtip vortices generated by the mothership. These vortices become a hazard during docking or undocking maneuvers.

In 2002, a doctoral dissertation by S. A. Magill titled "Compound Aircraft Transport Study Wingtip-Docking Compared to Formation Flight" was published by Virginia Polytechnic Institute. This document outlined a technical investigation of the hitchhiker-mothership type of compound aircraft in tip-docked and formation flight modes. The latter mode involves the creation of a virtual wing in chevron as discussed in the preceding text. The document did not consider the tip-docking of multiple, equal-sized aircraft. It did not address the pursuit of any type of compound aircraft design for the purpose of improving aircraft ceiling or performance at high altitude.

Thus, it will be appreciated that there is a need in the art to overcome one or more of these and/or other disadvantages. It also will be appreciated that there is a need in the art to provide a viable high altitude long endurance aircraft.

In certain exemplary embodiments, an autonomous modular flyer operable to loiter over an area of interest at a first high altitude is provided. Such flyers may comprise an airborne object having two wings, with each wing having a wingtip, and the wingtips being operably joinable to at least one other autonomous modular flyer's wingtips to form an aggregation when a first predetermined condition is met, and being operably disaggregable from the at least one other autonomous modular flyer's wingtips when a second predetermined condition is met. The aggregation may form a multiple-articulated flying system having a high aspect ratio wing platform, operable to loiter over the area of interest at an altitude at least as high as the first high altitude.

Autonomous modular flyers and/or aggregations thereof may be further operable to match their airspeed to a prevailing headwind and/or to make large orbits. Autonomous modular flyers and/or aggregations thereof may have an altitude ceiling in Earth's stratosphere and/or structural robustness in Earth's troposphere. The autonomous modular flyer may further comprise a wingtip hinge on at least one wingtip allowing two operably joined modular flyers to flap about the wingtip hinge with respect to each other.

Aggregations of larger numbers of modular flyers may occur at sequentially higher altitudes. A second predetermined condition may include one or more of: a loading event above a given load threshold, a gust above a gust threshold, a turn of the multiple-articulated flying system, a span shear above a span shear threshold, an instruction for at least one of the modular flyers to undertake a remote surveillance activity, and an instruction for at least one of the modular flyers to move closer to the area of interest. The multiple-articulated flying surface of claim 1 may be operable to reaggregate based at least on a third predetermined condition. That third predetermined condition may include one or more of: a second predetermined condition that previously was met no longer is met, and at least one modular flyer being destroyed, recalled, and/or no longer functional.

Insolation circuitry may power each modular element and/or the multiple-articulated flying system, and the insolation circuitry may comprise a photovoltaic array, an electronic controller to condition and manage the power, and an electrical energy storage mechanism. A flight controller operable to calculate an equilibrium ceiling altitude and to instruct the autonomous modular flyer to climb or descend to the equilibrium ceiling altitude may be included in modular flyers.

Certain exemplary embodiments provide a method of forming a multiple-articulated flying system having a high aspect ratio wing platform, operable to loiter over an area of interest at a high altitude. Such methods may comprise providing at least two autonomous modular flyers, with each having two wings with wingtips thereon. The wingtips of the at least two autonomous modular flyers may be joined when a first predetermined condition is met.

Such methods may further comprise calculating an equilibrium ceiling altitude for the autonomous modular flyer, and altering the autonomous modular flyer's altitude to the equilibrium ceiling altitude. Also, an equilibrium ceiling altitude for the multiple-articulated flying system may be calculated, and the multiple-articulated flying system's altitude may be altered to match the equilibrium ceiling altitude.

Also, data related to the area of interest may be sensed by an individual modular flyer. When a multiple-articulated flying system is formed, data may be shared between sensors of modular flyers and/or using individual sensors of modular flyers as elements in a sensor array.

BRIEF DESCRIPTION OF THE DRAWINGS

These and other features and advantages will be better and more completely understood by reference to the following detailed description of exemplary illustrative embodiments in conjunction with the drawings, of which:

FIG. 8A is a plot of mean wind speed as a function of altitude and latitude for the case of a northern hemisphere winter;

DETAILED DESCRIPTION

Figure 1:
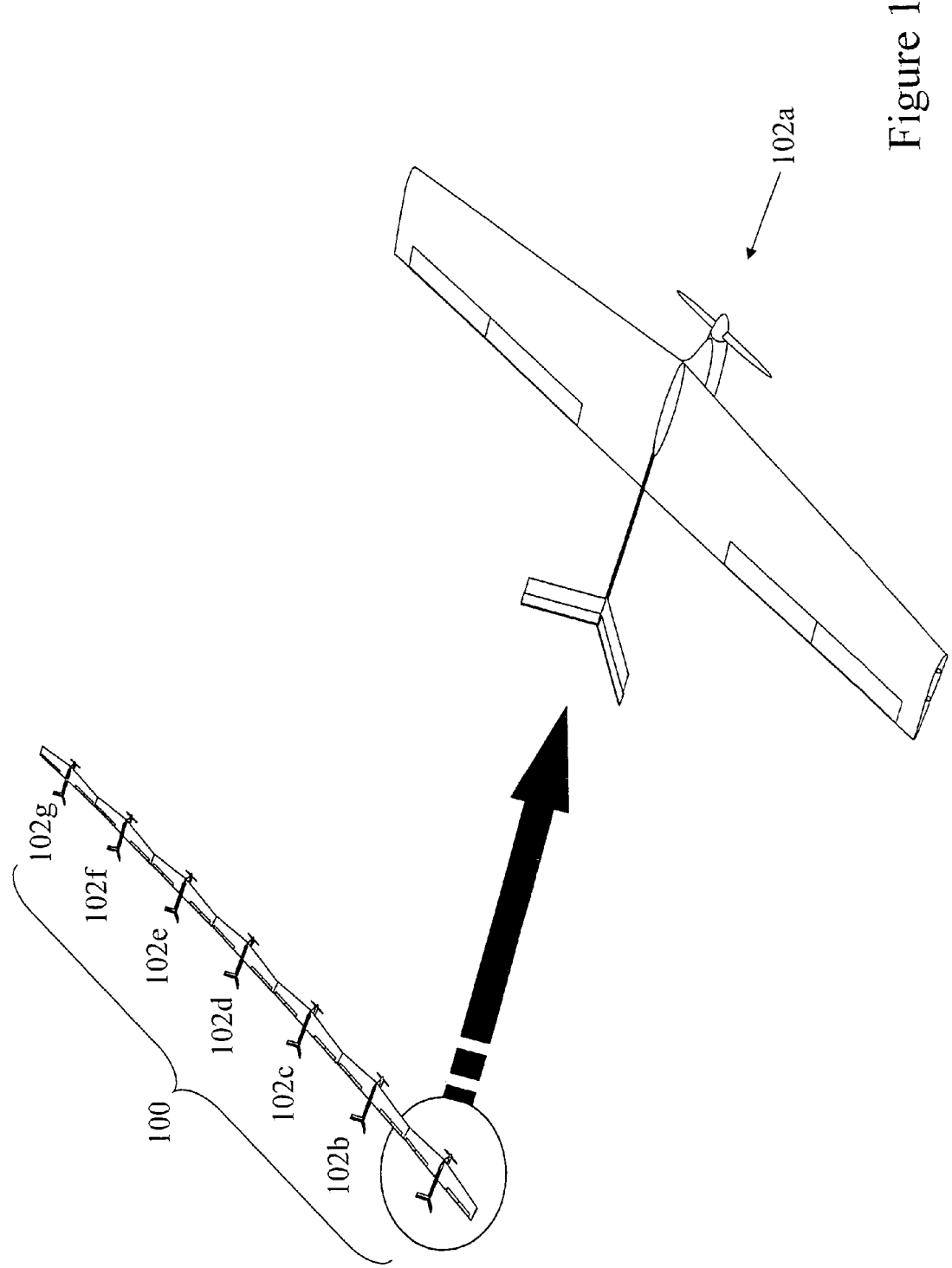
FIG. 1 shows an exemplary multiple-articulated flying system having a high aspect ratio wing platform, and an enlarged view of an exemplary flyer comprising such a system.

Certain exemplary embodiments provide a means of solving a conundrum of design for high altitude flight. Specifically, certain exemplary embodiments comprise an aircraft that has a ceiling well into the stratosphere; the ability to loiter on station indefinitely at that ceiling; and structural robustness in the troposphere. Heretofore, no more than two of these three conditions could be satisfied in one aircraft design. The exemplary embodiments herein may provide the additional benefits of operational flexibility and access to any point on the globe within a matter of hours.

In a more general sense, the exemplary embodiments herein have the potential to improve the endurance, range, robustness, and operational flexibility of the most efficient of aircraft designs, the span-loaded flying wing. The exemplary embodiments herein may free the aircraft designer from constraints associated with span-wise bending, whether resulting from gust loads or maneuvering loads. This is achieved by trading structural benefits against the cost of additional complexity of flight control.

In a space exploration role, certain exemplary embodiments provide a means of exploring planetary atmospheres. For example, certain exemplary embodiments are well-suited for flight at low altitudes on Mars. In the general case, benefits for flight in all planetary atmospheres, even those of high density may be realized. A modular aspect of certain example embodiments greatly facilitates design of the spacecraft that would carry the aircraft across interplanetary space and then insert it into a given planetary atmosphere.

In addition to freeing the aircraft designer from structural constraints, certain exemplary embodiments free the mission payload designer from certain constraints of systems integration. For surveillance missions, sensor resolution increases with sensor size, or in the case of a sparsely populated phased array, with the length of the baseline between the most widely separated elements. Certain exemplary embodiments theoretically are unlimited in wingspan, so remarkably good sensor resolutions may become possible. For communications payloads, large wingspan enables wide separation of antenna elements, which reduces mutual interference and facilitates simultaneous operation of multiple receivers and transmitters.

Certain example embodiments relate to a compound aircraft system comprised of multiple autonomous modular elements that are joined wingtip-to-wingtip. The compound aircraft is herein designated a "skybase" and its modular elements are designated "flyers." The flyers together form a single, multiple-articulated flying surface of great aerodynamic efficiency. The skybase is a machine analog to a biological colony or superorganism. The flyers when flying independently form a swarm. The swarm of flyers coalesces into a skybase with a different morphology, and the aerodynamic performance of the system is increased in consequence. The skybase can aggregate or disaggregate at will, such being the source of its aero-structural advantages and operational flexibility.

FIG. 1 shows an exemplary multiple-articulated flying system having a high aspect ratio wing platform, and an enlarged view of an exemplary flyer comprising such a system. Flyers 102a-g are joined wingtip-to-wingtip by a quick-connect and quick-release hinge mechanism to form skybase 100. This mechanism allows flyers to flap about the hinge with respect to each other. The mechanism also allows rotation in the pitch direction (i.e. about the lateral axis). According to certain exemplary embodiments, there is no degree of freedom in yaw because of a lack of need for one, however the present invention is not so limited.

A conventional wing is designed to resist span-wise bending moments that result from normal loads, whether caused by maneuvering or gusts. This sets a floor for the structural strength and thus a weight of the wing structure. In contrast, the articulated wing of a skybase is designed to break apart at some low threshold of loading—e.g. wingtip hinges serve as fusible links in a structural sense. After the high load event, the flyers reconnect and reform the skybase. Individual flyers have relatively low aspect ratios and are quite stiff in span-wise bending. The skybase has a high aspect ratio but can be much lighter than a non-articulated wing, since it does not need to resist span-wise bending moments.

The wingtip hinges are designed to accommodate some degree of flapping before a loading event causes separation, so as to prevent nuisance disaggregation. The flap limit is determined by the geometric constraints of the gap seals that are necessary for aerodynamic performance in the joined state. These gap seals cover the hinges on both the lower and upper wing surfaces.

Wingtip hinge freedom in pitch gives the skybase a unique capability to tailor its span-wise wing twist to operating conditions. For example, progressively reducing the angle of incidence of flyers as a function of their distance from the skybase centerline provides washout. Washout can be used to modify the span-wise lift distribution to reduce lift-induced drag. Washout also reduces the propensity of the inboard flyer of a skybase to stall when the skybase is turning. This allows the skybase turn rates to be greater than would be possible with a conventional wing of equivalent span. It will be appreciated that only a small range of pitch variability is required to provide these benefits, and this range may be accommodated by the design of the hinge gap seals.

A skybase has an alternative method of turning that may be operationally preferable. The individual flyers forming the skybase can separate, turn as individuals, and reform into a skybase that is oriented to a new heading. This method is analogous to the turning of a flock of birds. It circumvents the problem noted above, that the inboard flyer of a skybase has a propensity to stall when the skybase is turning as a single assembly.

Figure 2:
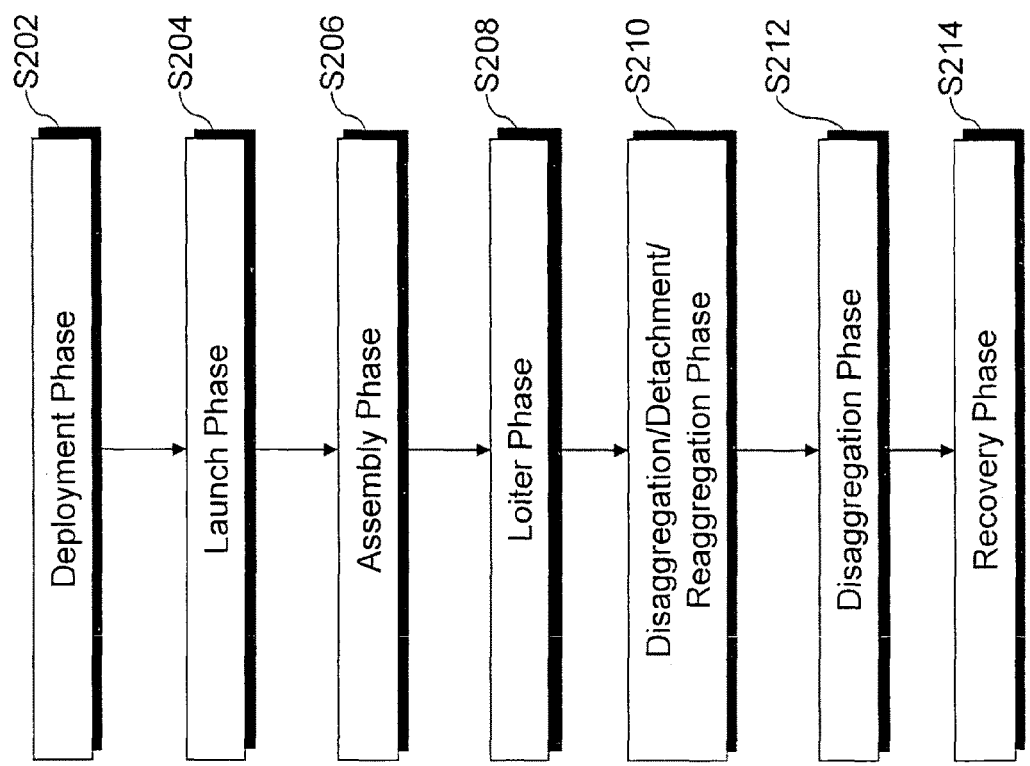
FIG. 2 is an exemplary lifecycle of a skybase.

FIG. 2 is an exemplary lifecycle of a skybase. The life cycle of a skybase can be divided into seven phases: (1) a deployment phase (S202), (2) a launch phase (S204), (3) an assembly phase (S206), (4) a loiter phase (S208), (5) an optional disaggregation-detachment-reaggregation phase (S210), (6) a disaggregation phase (S212), and (7) a recovery phase (S214). It will be appreciated that when the skybase is being used in the space exploration role, phases (2), (6) and (7) may not exist.

Phase (1) involves deployment of the skybase to a theater of operations that may be on the other side of the globe, or in the case of space exploration, on another planet. In the terrene case, skybase flyers can be sized for packaging into standard cargo containers, which are carried by container ships to overseas ports where they are transferred to trucks. The trucks then carry the containers to forward operating locations, where the flyers are removed from the containers and prepared for launch. In the military case, this method of deployment facilitates covert prepositioning of skybase flyers and associated support hardware, since the cargo containers are outwardly generic.

An alternative deployment method applicable to military use allows access to any point on the globe within a matter of hours. Flyers are loaded into one or more cargo aircraft, the number of flyers in each aircraft being dependent on the size of cargo bay. The cargo aircraft fly to a theater of operations, and their cargo ramps are lowered in flight. Skybase flyers are then sequentially pulled from the cargo aircraft by means of a parachute extraction system. In this manner, multiple skybase flyers are delivered to an airborne assembly location, and phase (2), the launch phase, can be dispensed with. This method of deployment is also potentially covert, since the contents of the cargo aircraft will not be outwardly discernable, and the flyers can be air-launched beyond the range of ground-based detection systems. Finally, returning to the use of a skybase in space exploration, in one exemplary embodiment, flyers can be packaged into a probe shaped as a frustum, either radially or circumferentially disposed but in both cases standing on their wingtips. Below the frustum is a heat shield for planetary entry. A parachute package and other ancillary equipment are located above the frustum. This probe is injected into a planetary atmosphere, it decelerates, the heat shield is released and the parachutes deploy. Once a sufficiently low sink rate has been achieved, skybase flyers rotate out of the frustum, pivoting about the wingtips on which they have been resting. Once clear of the frustum, the flyers progress to phase (3), the assembly phase.

In phase (2), the launch phase, flyers take off from an airfield, either individually or in flights of multiple units depending on the width of the runway and on any operational need for a rapid launch process. In a preferred embodiment, the flyers have no landing gear but are equipped with skids faired into the underside of their fuselages. The flyers may be dolly-launched. A dolly is a wheeled cart that may or may not have motive power. An individual flyer is placed on a dolly and disposed at the end of a runway for launch. The dolly accelerates, either under its own power or motivated by the flyer's propulsion system, and once the assembly reaches flyer takeoff speed the dolly releases the flyer which then promptly ascends. The dolly then decelerates and is returned to its start point for another launch. In this manner, the flyer does not have to carry the dead weight of landing gear aloft.

Figure 3:
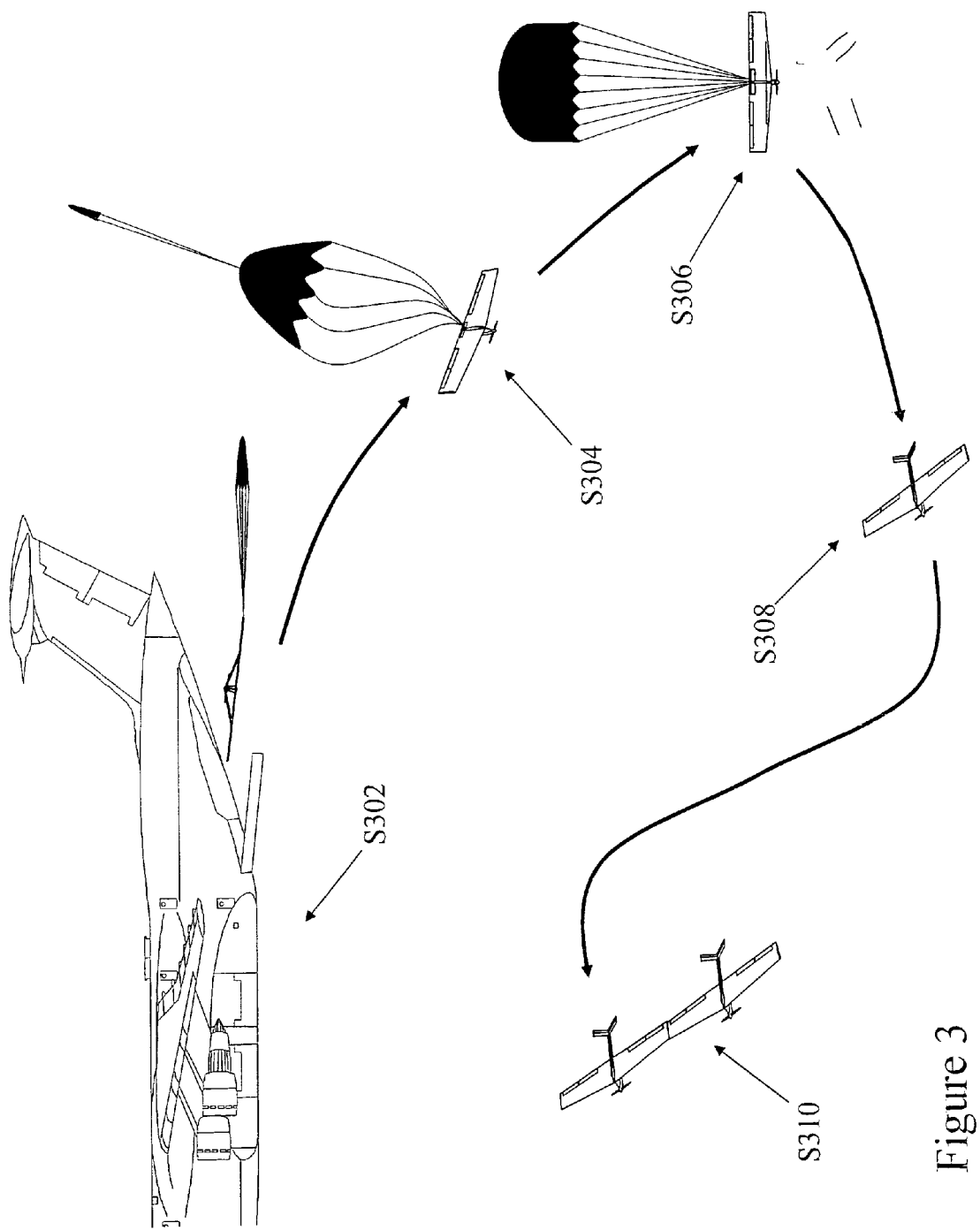
FIG. 3 shows an exemplary deployment process.

FIG. 3 shows an exemplary deployment process. In step S302, a drogue extracts a flyer for an airdrop, allowing rapid deployment. A main chute deploys from the flyer in step S304. Transport struts (optionally used to avoid damage to the flyers during transport and chute deployment) are jettisoned in step S306. Tail and side force controllers deploy in step S308 enabling the flyer to take flight. In step S310, flyers rendezvous to form a pair or doublet. The assembly process is described in further detail below.

Figure 4:
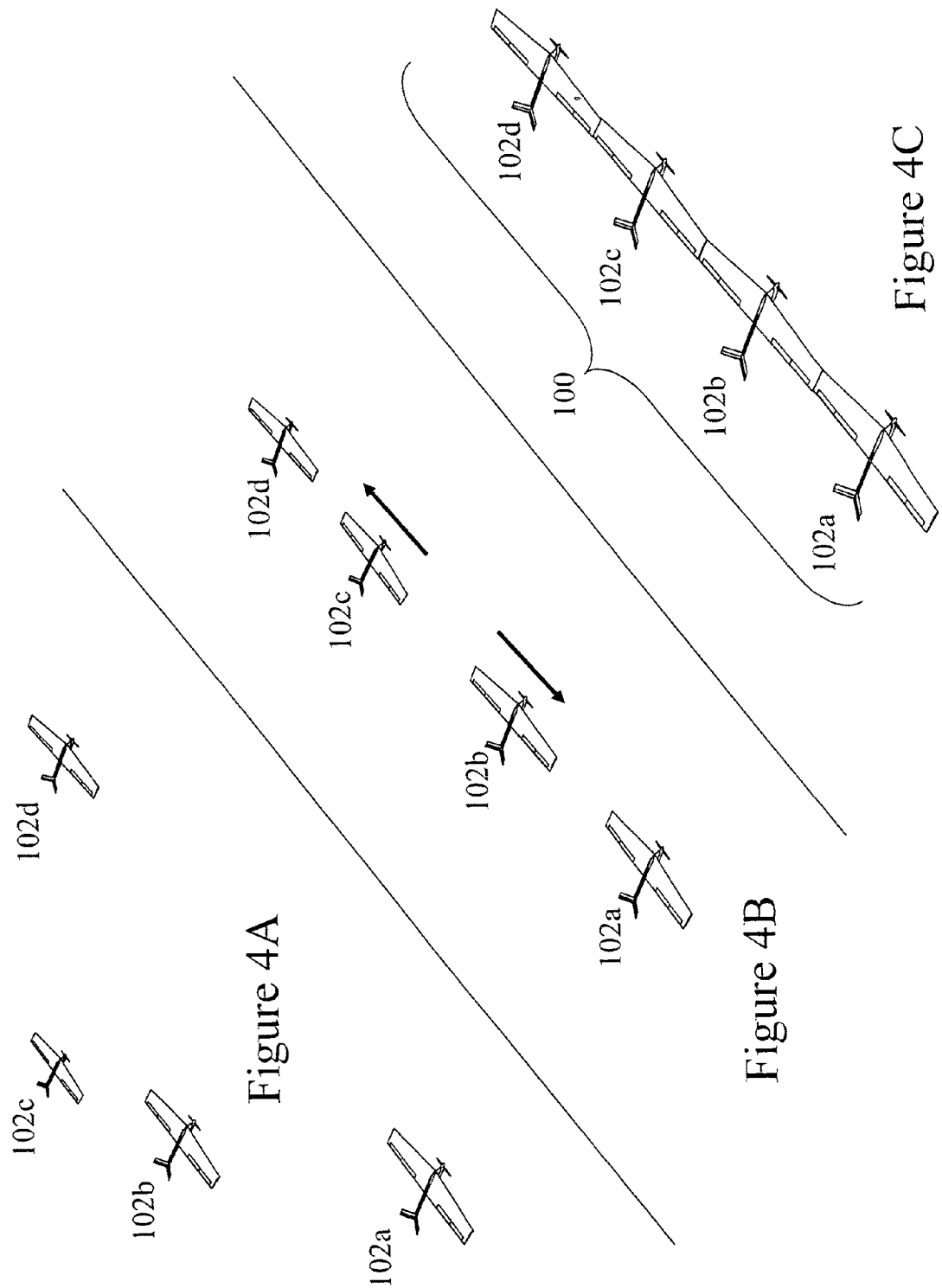
FIGS. 4A-4C show an exemplary assembly process.

In phase (3), the flyers self-assemble, as shown in FIGS. 4A-4C. Flyers 102a-d locate each other, rendezvous, and connect in doublets. These doublets then rendezvous with each other, and connect in quads, a quad may join a doublet to form a hexad, and so on until the desired skybase configuration has been achieved. Each time the number of flyers in a skybase subassembly increases, its aspect ratio increases and as a consequence, its ceiling increases. The tendency is thus for couplings of larger numbers of flyers to occur at sequentially higher altitudes. This is generally optimum in a structural sense. Each flyer is structurally robust, being of low aspect ratio design, and is thus well-matched to high gust loads associated with the denser air at lower altitudes in the troposphere. While gusts do occur at higher altitudes, they are mostly associated with convective or mountain wave activity, and can usually be avoided. To achieve high altitudes, a skybase must coalesce into a high aspect ratio platform that is structurally weaker. A conventional wing would break when encountering a gust at these altitudes, whereas a skybase may subdivide and then reform.

In principle, there is no limit to the number of flyers that can be connected to form a skybase. In practice, however, there are diminishing returns to aspect ratio in terms of aerodynamic efficiency. At the extreme, difficulties will be experienced when the skybase is wide enough to span a shear between air masses moving at differing velocities, an event that would demand that the skybase spontaneously subdivide at the locus of shear. Such an event is herein defined as a "span shear."

Thus, FIG. 4A shows a swarm of flyers 102a-d locating each other. They rendezvous in FIG. 4B, and two doublets (102a-b and 102c-d) are formed. Finally, in FIG. 4C, the two doublets rendezvous to form skybase 100.

In phase (4), the skybase loiters at altitude. Occasionally the skybase may subdivide and reform when encountering gusts. If the skybase is flying into a headwind, it may match its airspeed to oppose the wind, and the skybase will then have zero groundspeed—it will be able to hover over a point on the ground. If there is little or no headwind, the skybase must fly in orbits. These orbits could involve shallow turns describing large circles over the ground, or they could be shaped as narrow ovals, with the skybase disaggregating, flyers turning and reaggregating at each end of the oval, as previously described. It will be appreciated that a preferred orbit shape would depend on the requirements of the particular mission payload that is carried by the skybase.

In phase (4), and indeed in all phases, the modular nature of the skybase results in very graceful degradation in case of loss of a flyer, or indeed in case of any subsystem failure within a flyer. Skybase system survivability and reliability is decoupled from that of its component flyers. If flyers are lost during the assembly phase (e.g. from flying through a storm), a skybase can still be formed, albeit with a lower operational ceiling. In the military case, if a skybase is attacked by a surface-to-air weapon and one or more of its component flyers are damaged, the skybase can disaggregate, reject its useless components, and reaggregate in abbreviated form. System capability would be lost, but system functionality would be retained. Eventually, replacement flyers could be flown out to the skybase and full system capability would be restored. In a preferred embodiment, this capability to reconstitute a skybase gives it a capability for being "forever on-station" that cannot be matched by any unitary (e.g. non-modular) design.

Figure 5:
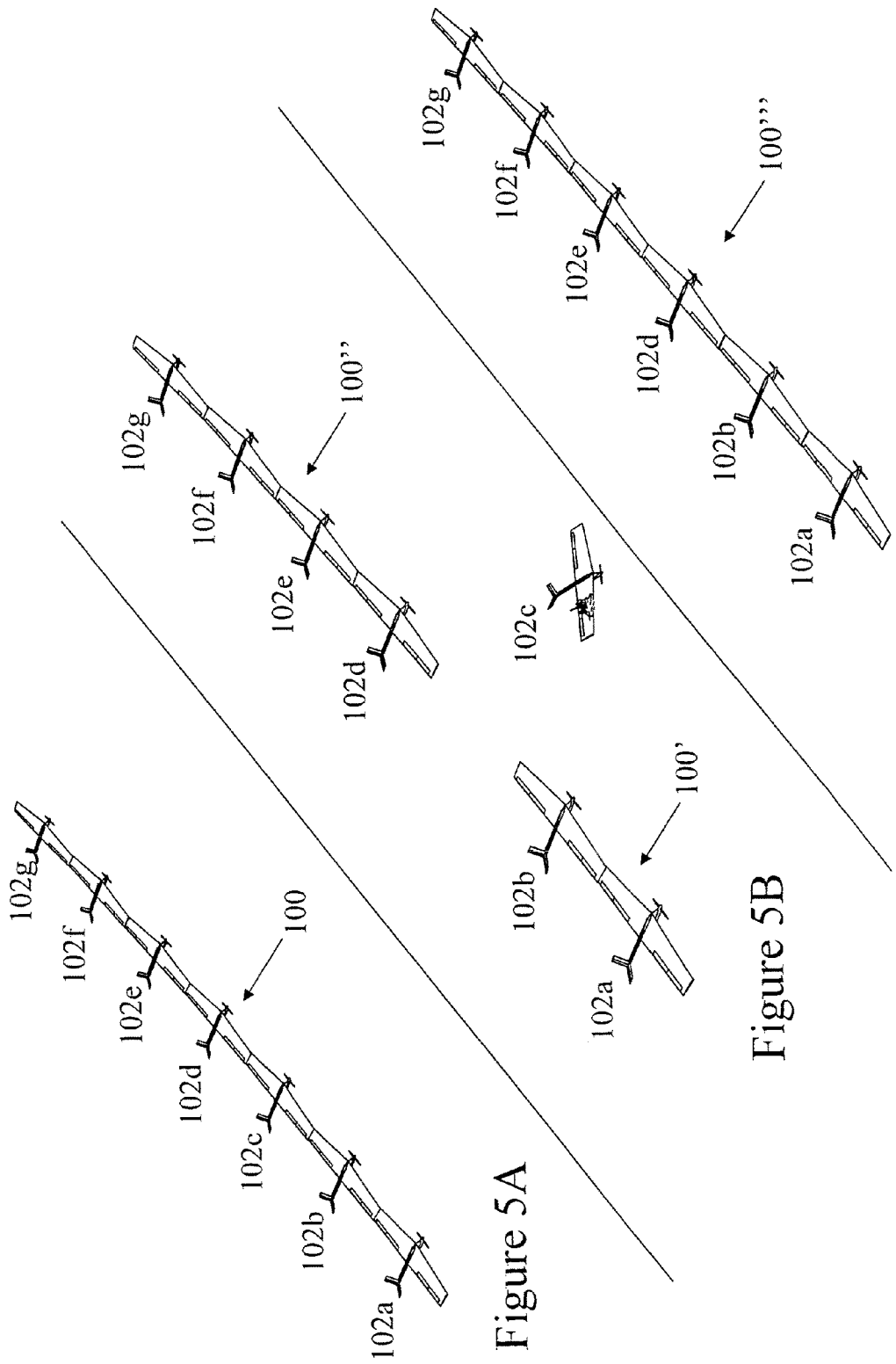
FIGS. 5A-5C show an exemplary reaggregation process.

FIGS. 5A-5C show an exemplary reaggregation process. FIG. 5A shows skybase 100, including flyers 102a-g. In FIG. 5B, flyer 102c crashes (e.g. fails, is shot down, etc.). It will be appreciated that other reasons for a flyer leaving a skybase may exist, such as, for example, a flyer being recalled, instructed to survey an area of interest from a closer location, etc. This leaves two smaller skybases, 100' and 100". FIG. 5C illustrates flyers 102a-b and 102d-g to form skybase 100''', thus reaggregating into a fully-functional skybase, demonstrating system survivability.

Phase (5) is an optional disaggregation-detachment-reaggregation phase. A skybase is in a sense a virtual aircraft carrier in the sky, a base of operations. Its modular design supports applications where it becomes necessary to investigate locations that are removed from the primary mission station. In surveillance applications, a skybase detachment (e.g. a doublet) can be separated from the main skybase. The detachment can then proceed to a remote mission station, perform surveillance as required, and then return and reattach to the skybase. Alternatively, if the skybase finds itself temporarily above cloud cover that interferes with its surveillance sensors, the detachment can descend to an altitude beneath the clouds and ensure that surveillance is not interrupted. Finally, a detachment may be sent to a lower altitude simply to get a higher resolution view of a target; a detachment may be offset from the skybase to peer behind a mountain range; it may be offset to enable bistatic sensor operation (e.g. having transmitters and receivers on spatially separated platforms); or, in the signals intelligence role, it may be offset to enable triangulation for geo-location of electromagnetic emissions.

Phase (6) is the disaggregation phase, which occurs if recovery of a complete skybase is desired. In contrast to the aggregation phase, there would normally be no need to disaggregate the skybase until it has descended to a pattern altitude near the recovery base. It will be appreciated that disaggreggation at high altitude may be preferred if it were desired to disperse flyers to more than one recovery base in a theater of operations. This might be necessary, for example, to maintain a balanced force structure if some recovery bases had suffered high attrition of flyers from enemy action or adverse weather.

Phase (7) is the recovery phase. Flyers are sequenced into the landing pattern, and land individually or in flights. In a preferred embodiment, landing skids that were faired into the fuselage for takeoff are extended. Each landing skid has a pair of small wheels affixed to either side, and these wheels allow the flyer to taxi off the runway under its own power, clearing the runway for subsequent flyers to land.

A preferred embodiment of the current invention is an unmanned solar-electric modular articulated-wing aircraft. This aircraft is able to reach the upper reaches of the Earth's atmosphere by virtue of self-assembly of modular elements ("flyers") at progressively higher altitudes. As flyers are added, the aspect ratio and thus lift-to-drag ratio of the articulated-wing aircraft ("skybase") is increased.

An alternative embodiment differing only in size from the preferred embodiment would be suitable for operation in the Martian atmosphere at low altitudes above ground level.

The skybase is able to loiter indefinitely at high altitude, either remaining fixed with respect to a location on the ground or performing turns about that location, depending on wind conditions. Aircraft endurance is not limited by fuel, since all power requirements are satisfied by insolation—that is, irradiance by solar flux. Aircraft endurance is not limited by component failure, since additional flyers can be flown out to the skybase to replace failed flyers as required.

The number of flyers required in a skybase is a function of several variables. For a given amount of electrical power supplied to the mission payload, the greater the number of flyers, the higher the altitude that can be achieved. Alternatively, at a given altitude, the greater the number of flyers, the greater the electrical power that can be supplied to the mission payload. Either way, the skybase must achieve an altitude where the winds are sufficiently light to allow permanent flight with power derived from insolation alone. If the mission payload requires some minimum line-of-sight to the horizon, the minimum required altitude (and hence, number of flyers) may be greater than that imposed by insolation constraints.

A solar-electric power system may comprise, for example, a photovoltaic array; an electronic controller to condition and manage the flow of power in the system; means to store electrical energy (such as, for example, a battery); and one or more electric motors to provide motive force. To allow continuous and indefinite operation, the solar energy used by the propulsive and mission systems in daylight plus the excess solar energy stored in the battery must be at least equal to the electrical energy consumed by the propulsive and mission systems during the night. In an exemplary embodiment, the power provided by the battery must be sufficient to allow the countering of headwinds at any altitude, with some margin for climbing and maneuvering of flyers during assembly of the skybase.

These considerations place a premium upon efficiencies of mechanical components, on aerodynamic efficiencies, and on the minimization of battery and structural weight, all to the end of achieving an altitude where the winds are low enough to allow permanent flight with the insolation available. The current invention enables this objective by maximizing aerodynamic efficiency while minimizing structural weight.

A preferred embodiment is like any other solar-electric aircraft, inasmuch as its absolute ceiling is greater than the altitude at which it enjoys maximum endurance. In the case of an exemplary embodiment with the capability for "forever on-station" operation, the maximum altitude at which flight can be sustained indefinitely is herein defined as equilibrium ceiling. Absolute ceiling is determined by the maximum propulsive power available from the solar-electric system at a given instant. Equilibrium ceiling is the altitude where energy available from insolation over the course of a day is exactly balanced by the energy expended by the aircraft over the course of a complete day-night cycle. The aircraft can operate above equilibrium ceiling temporarily, but if it is to maintain indefinite flight it must survive through the following night until the next insolation. Consequently, it must balance the lost energy by descending below equilibrium ceiling for a time.

Equilibrium ceiling is severely reduced in winter and at high latitudes, because of reduced insolation. If equilibrium ceiling is reduced to the point that the high winds commonly found at lower altitudes are encountered (e.g. in a jet stream) flight cannot be maintained. However, an exemplary embodiment has an inherent ability to minimize this loss of equilibrium altitude that is not shared by the prior art. The process is somewhat counterintuitive. As there is less insolation under winter and high latitude conditions, there is less energy to be stored in the course of a day; consequently, less battery capacity is required. An exemplary embodiment allows battery capacity to be tailored to insolation. For example, flyers with lighter "winter-weight" batteries can replace heavy-battery "summer-weight" flyers as the seasons progress. There still will be a loss of equilibrium altitude (or more flyers will be required to maintain a given equilibrium altitude), but the effect will be minimized. In contrast, the unitary designs in the prior art would either suffer a much larger loss in equilibrium altitude (assuming that they could even maintain indefinite flight in summer, equatorial conditions), or would be forced to return to base.

Figure 6:
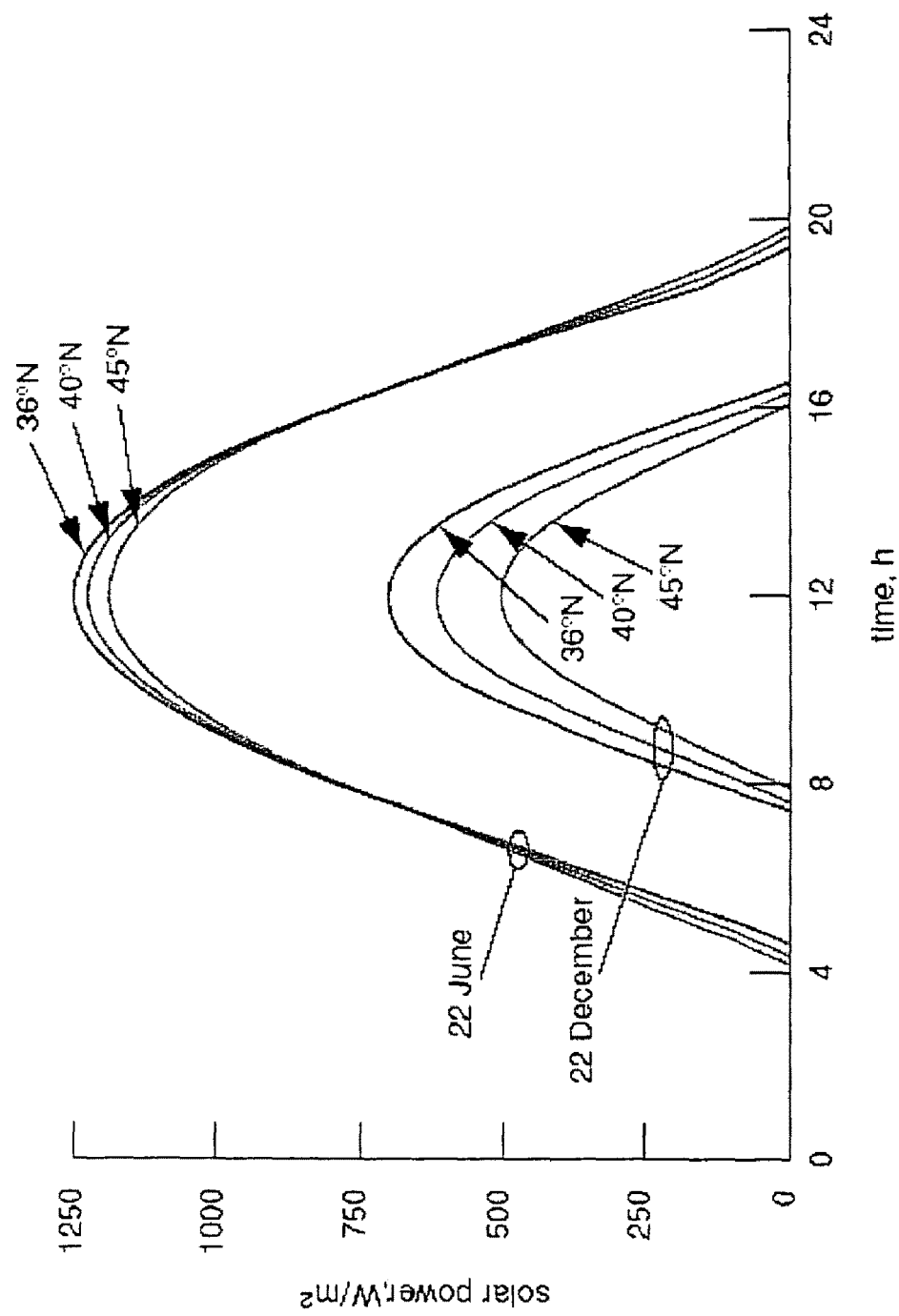
FIG. 6 shows solar flux in watts per square meter as a function of season and latitude.

FIG. 6 shows solar flux in watts per square meter as a function of season and latitude at an altitude of 17 km (about 56,000 ft). Time of day is shown on the horizontal axis. Incident flux at the winter solstice (December 22 in the northern hemisphere) is much less than during the summer solstice (June 22 in the northern hemisphere), especially at high latitudes. Under conditions of low solar flux, a skybase may either reduce altitude (unless that is prevented by the presence of high winds at lower altitude), reduce the electrical load of any mission payload, and/or increase the number of connected flyers. The last option is the great operational advantage of the modular skybase design—e.g. the ability to tailor aircraft size to the available solar flux.

Figure 7A:
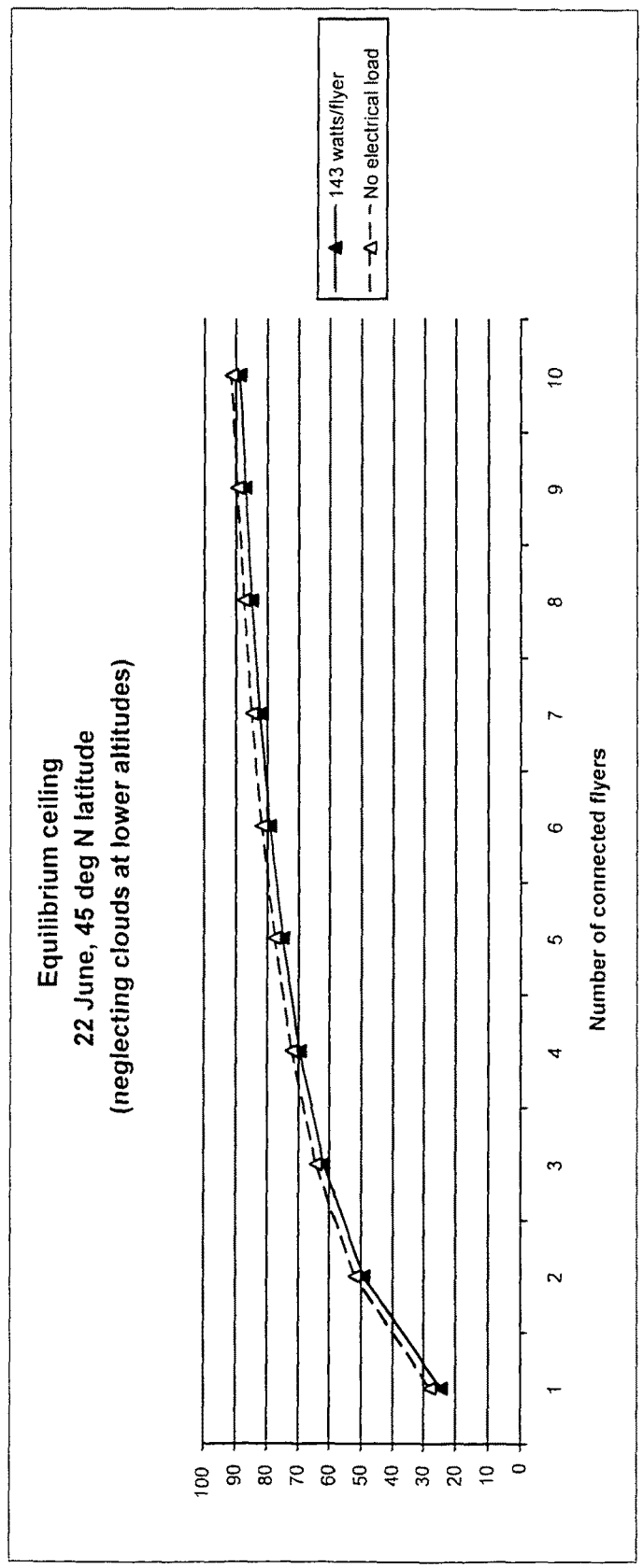
FIGS. 7A-7F show skybase equilibrium ceilings as a function of the number of connected flyers at various latitudes and at various times of the year.

FIGS. 7A-7F show skybase equilibrium ceilings as a function of the number of connected flyers at various latitudes and at various times of the year. Specifically, FIG. 7A presents the equilibrium ceiling of a skybase as a function of the number of connected flyers, for flight at 45 degrees of latitude at the summer solstice. Referring to the FIG. 6 showing solar flux, it can be seen that this represents a favorable, although not the best, case for solar flight. For low equilibrium ceilings (e.g. low numbers of connected flyers), it is assumed that there is no obscuration of solar flux as a result of cloud cover. The upper curve shows equilibrium ceiling for a skybase with no electrical load from a mission payload. The lower curve shows the reduction in equilibrium ceiling that results from an electrical draw of 143 watts per flyer (equating to one kilowatt in the seven-flyer skybase). These curves are valid for the parametric assumptions listed in Table 1, where η refers to efficiency, coverage factor refers to the proportion of wing area covered by photovoltaics, E refers to energy, $W_e$ is empty weight, $W_{batt}$ is battery weight, $W_o$ is total weight, $C_{lmax}$ is maximum lift coefficient, and $V_{cruise}$ is cruise velocity. Batteries are sized to the available solar flux, which is high—hence, these are "summer-weight" batteries.

TABLE 1

| Parametric Assumption | Value |
|---|---|
| Propeller η | 0.85 |
| Motor η | 0.89 |
| Battery η | 0.83 |
| Solar cell η | 0.30 |
| Coverage factor | 0.92 |
| Battery duration | 12 hrs. |
| Battery E density | 350 Whr/kg |
| Struct. wing loading | 0.8 lb/ft² |
| $W_e$/flyer | 166 lbs. |
| $W_{batt}$/flyer | 176 lbs. |
| $W_o$/flyer | 342 lbs. |
| Wing area/flyer | 208 ft² |
| $C_{Lmax}$ | 1.4 |
| $V_{cruise}$ | 33-129 KTAS |

For this condition, only three flyers are necessary to achieve a "forever on-station" altitude of 60,000 feet. At this altitude or above, it is reasonably certain that low winds will prevail. It will be appreciated that for this case, equilibrium ceiling is relatively insensitive to electrical demands from a mission payload.

Figure 7B:
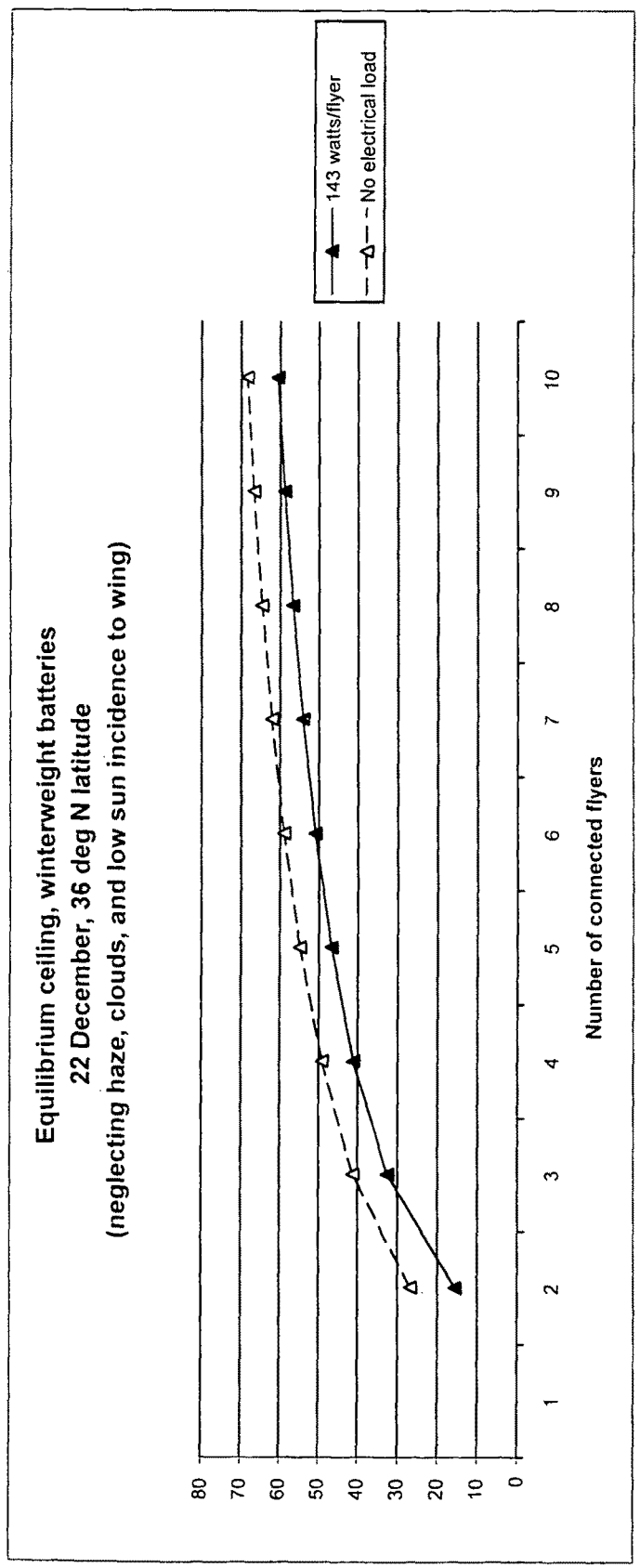

FIG. 7B shows equilibrium ceiling for the midwinter case at a latitude of 36 degrees. Battery weight is scaled to the available sunlight—hence, each battery pack weighs 80 pounds instead of 176 pounds in the previous case. These are "winter-weight" batteries. It will be appreciated that it now takes more flyers to achieve a "forever on-station" altitude of 60,000 feet. It also will be appreciated that the effect of a mission electrical draw is relatively more severe. Table 2 lists the parametric assumptions.

TABLE 2

| Parametric Assumption | Value |
|---|---|
| Propeller η | 0.85 |
| Motor η | 0.89 |
| Battery η | 0.83 |
| Solar cell η | 0.30 |
| Coverage factor | 0.92 |
| Battery duration | 15.5 hrs. |
| Battery E density | 350 Whr/kg |
| Struct. wing loading | 0.8 lb/ft² |
| $W_e$/flyer | 166 lbs. |
| $W_{batt}$/flyer | 80 lbs. |
| $W_o$/flyer | 246 lbs. |
| Wing area/flyer | 208 ft² |
| $C_{Lmax}$ | 1.4 |
| $V_{cruise}$ | 20-63 KTAS |

Figure 7C:
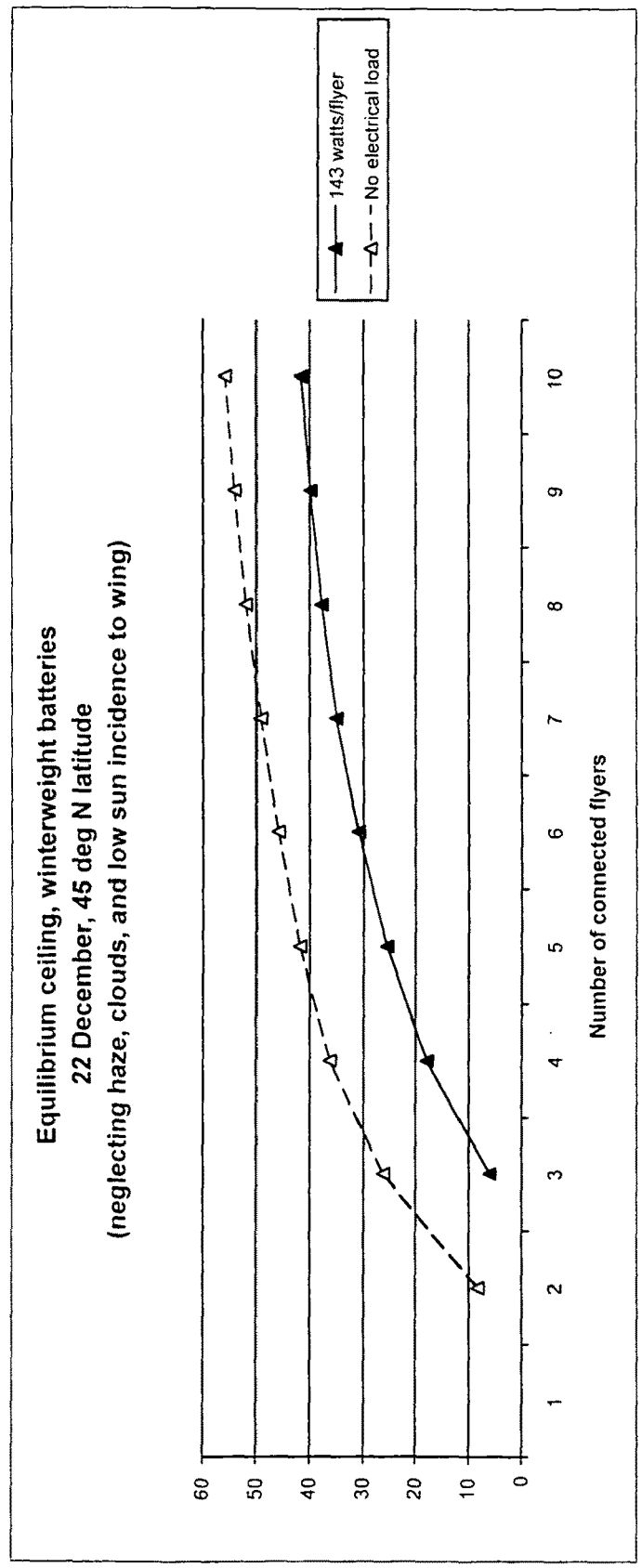

FIG. 7C shows the effect of an increase in latitude to 45 degrees, still midwinter with winter-weight batteries. This is a challenging case. With ten or fewer flyers, it is no longer possible for a skybase to achieve an equilibrium ceiling of 60,000 feet. Unless winds at lower altitude are low, "forever on-station" flight will not be possible. This shows how solar flux restricts the operation of even the most efficient solar aircraft. Table 3 lists the parametric assumptions

TABLE 3

| Parametric Assumption | Value |
|---|---|
| Propeller η | 0.85 |
| Motor η | 0.89 |
| Battery η | 0.83 |
| Solar cell η | 0.30 |
| Coverage factor | 0.92 |
| Battery duration | 16.5 hrs. |
| Battery E density | 350 Whr/kg |
| Struct. wing loading | 0.8 lb/ft² |
| $W_e$/flyer | 166 lbs. |
| $W_{batt}$/flyer | 52 lbs. |
| $W_o$/flyer | 219 lbs. |
| Wing area/flyer | 208 ft² |
| $C_{Lmax}$ | 1.4 |
| $V_{cruise}$ | 16-44 KTAS |

Figure 7D:
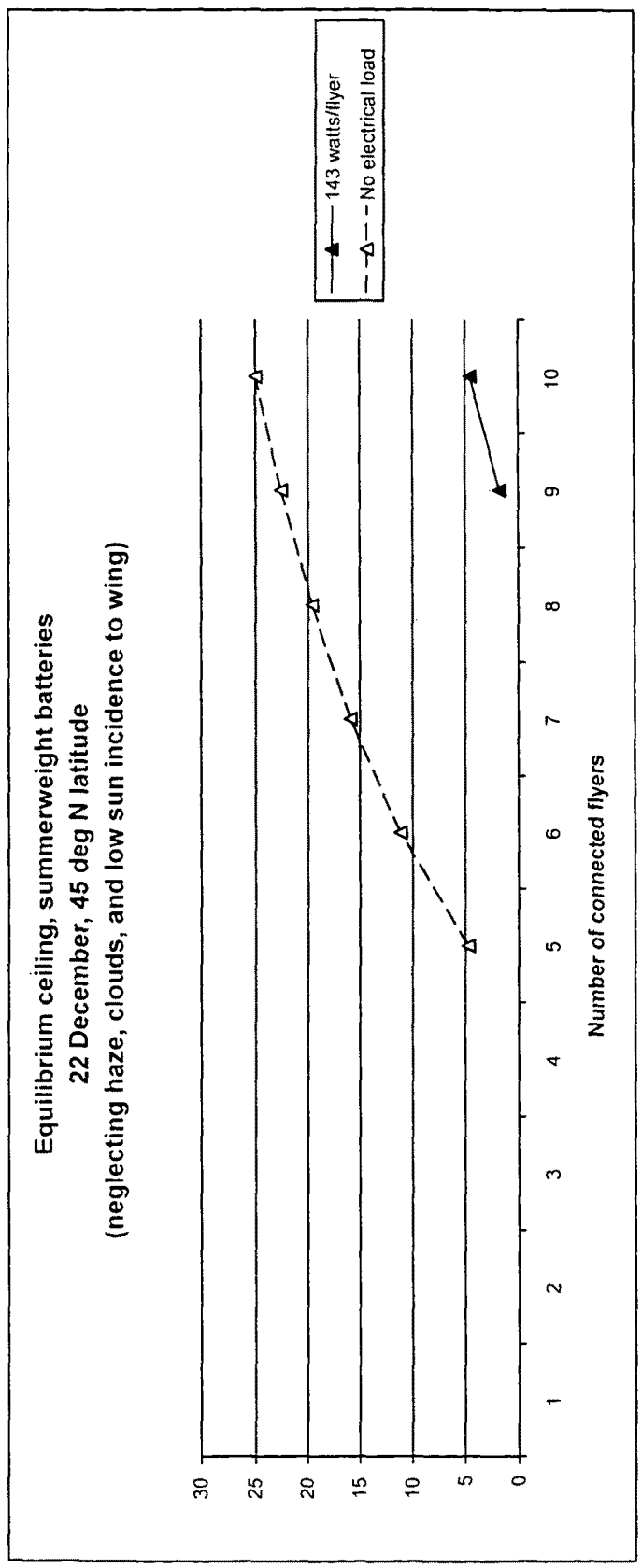

FIG. 7D shows the crippling effect of flying in winter with batteries that are sized for summertime levels of solar flux. Equilibrium ceilings are below ground level for less than five-flyer or nine-flyer skybases, depending on mission electrical demands. In such cases, perpetual flight cannot be maintained at any altitude, whatever the prevailing winds. This demonstrates a great advantage of the modular skybase design. Since winter-weight flyers can cycle out to a skybase to replace summer-weight flyers as the seasons progress, gross battery weight can be continuously tailored to available solar flux, and flight performance can thereby be maximized. This is not possible with a unitary (e.g. non-modular) design. Table 4 lists the parametric assumptions.

TABLE 4

| Parametric Assumption | Value |
|---|---|
| Propeller η | 0.85 |
| Motor η | 0.89 |
| Battery η | 0.83 |
| Solar cell η | 0.30 |
| Coverage factor | 0.92 |
| Battery duration | 55 hrs. |
| Battery E density | 350 Whr/kg |
| Struct. wing loading | 0.8 lb/ft² |
| $W_e$/flyer | 166 lbs. |
| $W_{batt}$/flyer | 176 lbs. |
| $W_o$/flyer | 342 lbs. |
| Wing area/flyer | 208 ft² |
| $C_{Lmax}$ | 1.4 |
| $V_{cruise}$ | 16-28 KTAS |

Figure 7E:
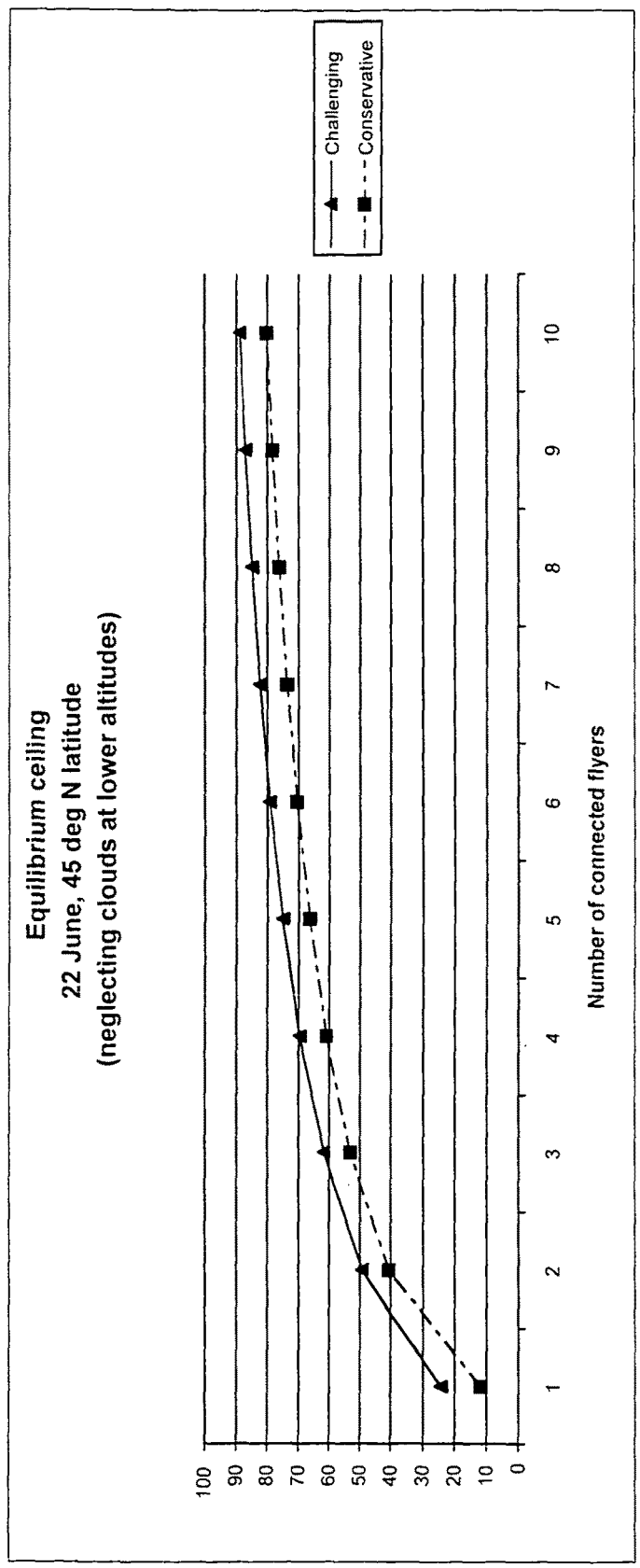

FIG. 7E shows the sensitivity of the skybase design to the parametric assumptions of the previous cases. The upper curve represents the same case as the 143 watts per flyer electrical load case of FIG. 7A. The lower curve shows the effect of a less-challenging set of design criteria. It can be seen that one more flyer (i.e. a total of four) is required to achieve an equilibrium ceiling of 60,000 feet. Table 5 lists the parametric assumptions corresponding to less challenging criteria.

TABLE 5

| Parametric Assumption | Value |
|---|---|
| Struct. wing loading | 0.85 lb/ft$^2$ |
| $W_e$/flyer | 177 lbs. |
| $W_{batt}$/flyer | 176 lbs. |
| $W_o$/flyer | 353 lbs. |
| Energy Density | 300 Whr/kg |
| Solar Cell $\eta$ | 0.27 |
| Coverage Factor | 0.88 |

Figure 7F:
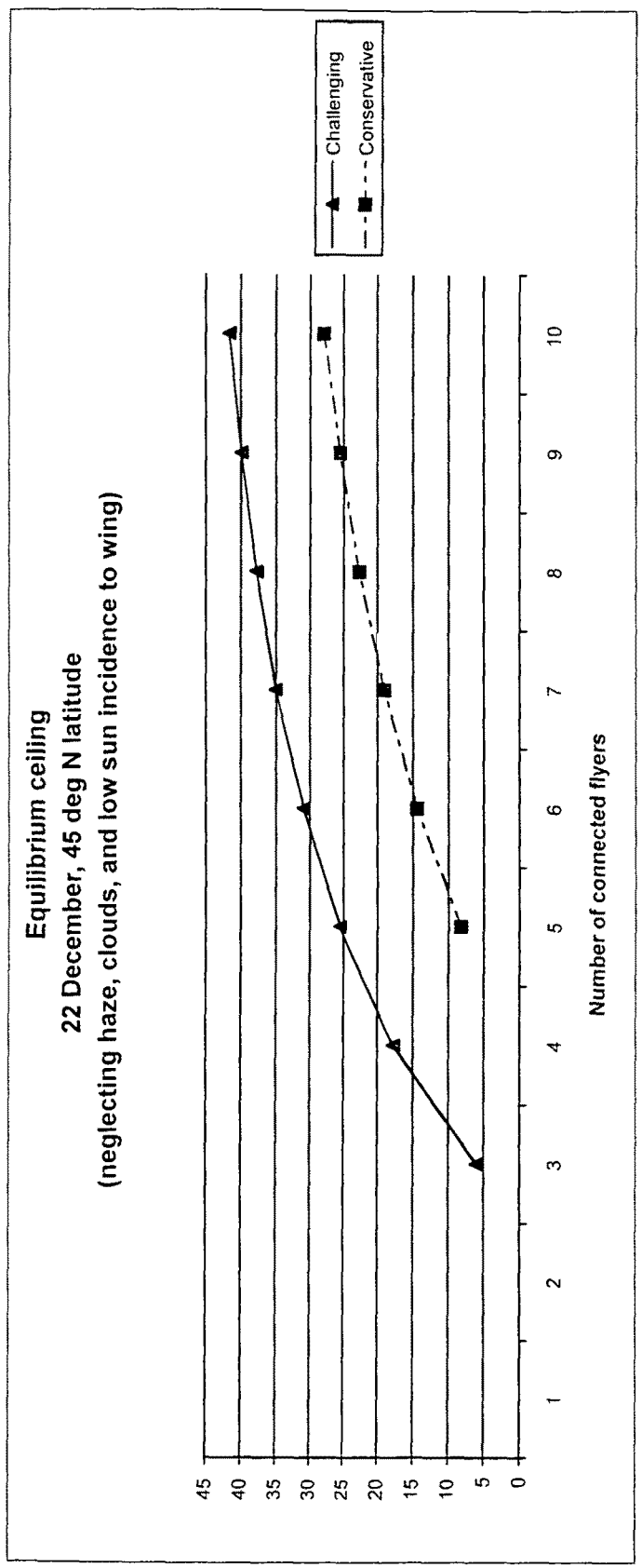

FIG. 7F parallels the circumstances of FIG. 7C—a midwinter skybase at 45 degrees latitude with winter-weight batteries, again with 143 watts per flyer electrical load. It will be appreciated that the loss of equilibrium ceiling that results from relaxed design criteria is more severe than in the previous case. Table 6 lists the parametric assumptions corresponding to less challenging criteria.

TABLE 6

| Parametric Assumption | Value |
|---|---|
| Struct. wing loading | 0.85 lb/ft$^2$ |
| $W_e$/flyer | 177 lbs. |
| $W_{batt}$/flyer | 53 lbs. |
| $W_o$/flyer | 229 lbs. |
| Energy Density | 300 Whr/kg |
| Solar Cell $\eta$ | 0.27 |
| Coverage Factor | 0.88 |

FIG. 8A is a plot of mean wind speed as a function of altitude and latitude for the case of a northern hemisphere winter. It is important to note the location of the northerly and southerly jetstream cores, and how the winter jetstream is stronger than the summer jetstream. It also is important to note that there is wide variability in wind speeds in the upper atmosphere from day to day that is not captured by this plot. Nevertheless, it is a useful tool for visualization of mean wind conditions.

Figure 8B:
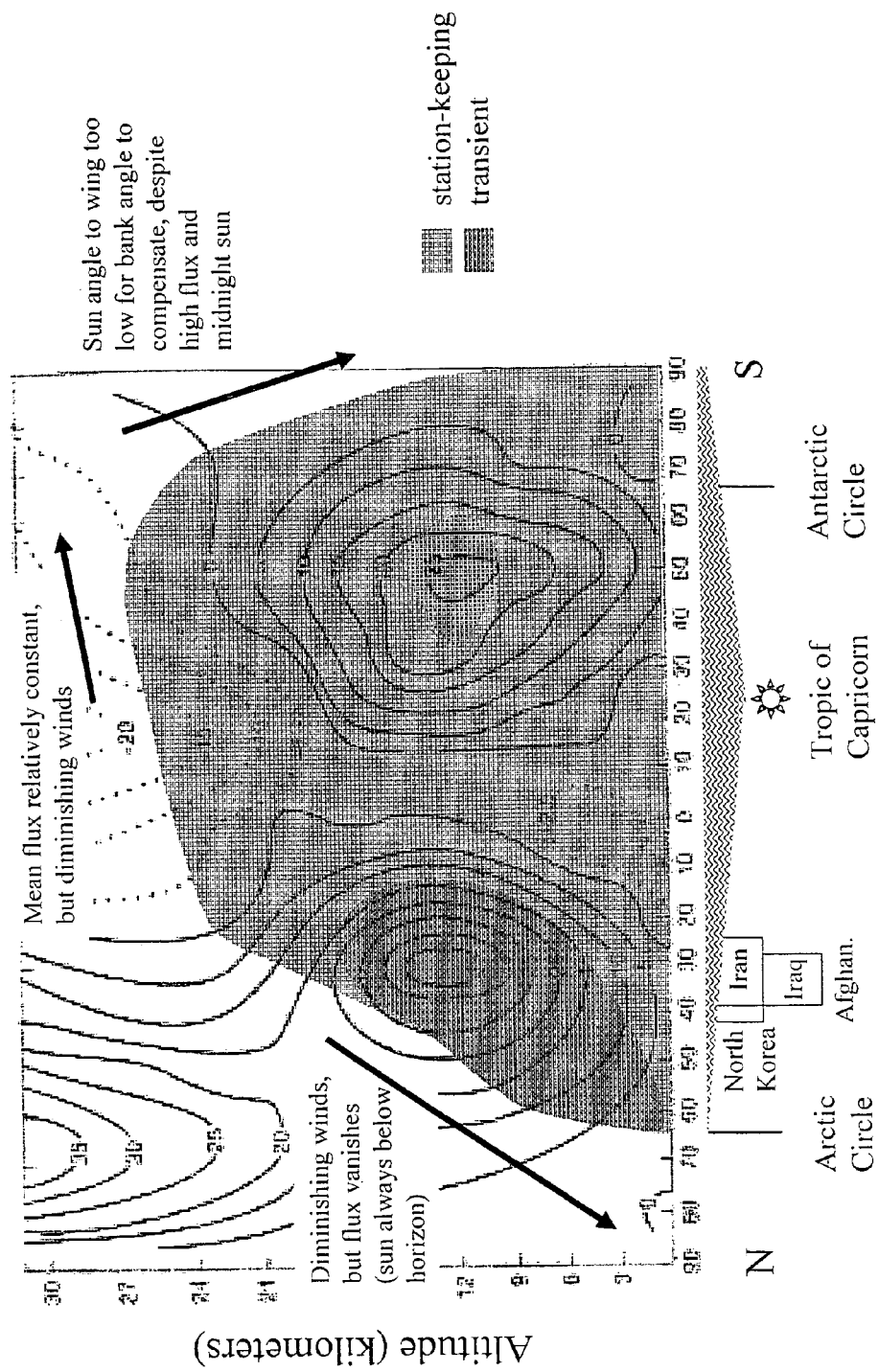
FIG. 8B is superimposes a representation of estimated skybase performance on the mean wind plot from FIG. 8A.

FIG. 8B superimposes a representation of estimated skybase performance on the mean wind plot from FIG. 8A. The sun is shown over the Tropic of Capricorn, corresponding to the summer solstice in the southern hemisphere. It is assumed that flyers are added as required, up to a limit of ten. An electrical load of 143 watts per flyer is assumed. Lighter areas designate combinations of altitude and latitude where a skybase can operate indefinitely. Darker areas designate regions where winds are too high for a skybase to maintain position over a fixed location on the ground, even though equilibrium ceiling considerations would otherwise enable perpetual flight. The upper bound of both lighter and darker areas represents equilibrium ceiling. A skybase can operate above this contour, but only for limited periods. Generally, no flight is possible north of the Arctic circle. This is logical, as there is constant darkness there in this case of a northern midwinter. In contrast, Antarctica is at the same time the land of the midnight sun. Solar-powered aircraft can fly, but the sun is very low to the horizon, and the glancing incidence of sunlight to the photovoltaics reduces efficiency and thus altitude performance.

It will be appreciated that in the northern winter in mean wind conditions, it is possible for a skybase to maintain flight over a location on the ground indefinitely, up to a latitude of perhaps 45 degrees.

Figure 9:
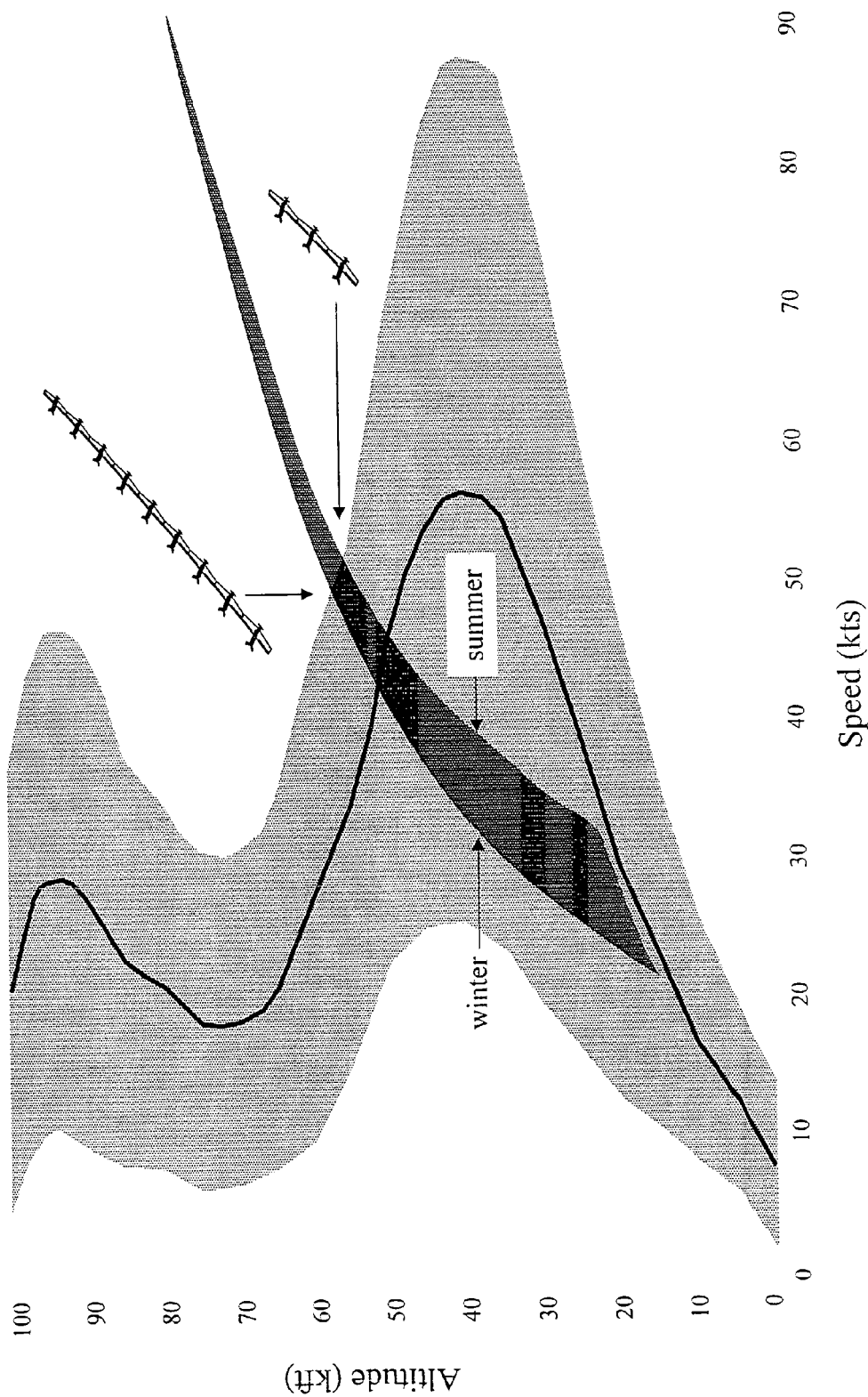
FIG. 9 shows skybase airspeed superimposed on winds aloft near Baghdad, Iraq, observed between 1958 and 1990.

FIG. 9 shows skybase airspeed superimposed on winds aloft near Baghdad, Iraq, observed between 1958 and 1990. It includes unclassified information from military weather records provided by the United States Air Force Combat Climatology Center, Asheville, N.C. The solid dark line represents mean winds. The light-shaded region represents the variation of observed winds. An electrical demand of 143 watts per flyer is assumed. The number of flyers in a skybase is allowed to vary. The left-hand boundary of the dark-shaded region depicts skybase airspeed in midwinter, while the right-hand boundary represents midsummer. "Forever on-station" flight is achieved where the dark-shaded region departs from the light-shaded region—in this case, at about 57,000 feet. In midwinter, this necessitates nine flyers in the skybase. In midsummer, three flyers generally are required.

Figure 10:
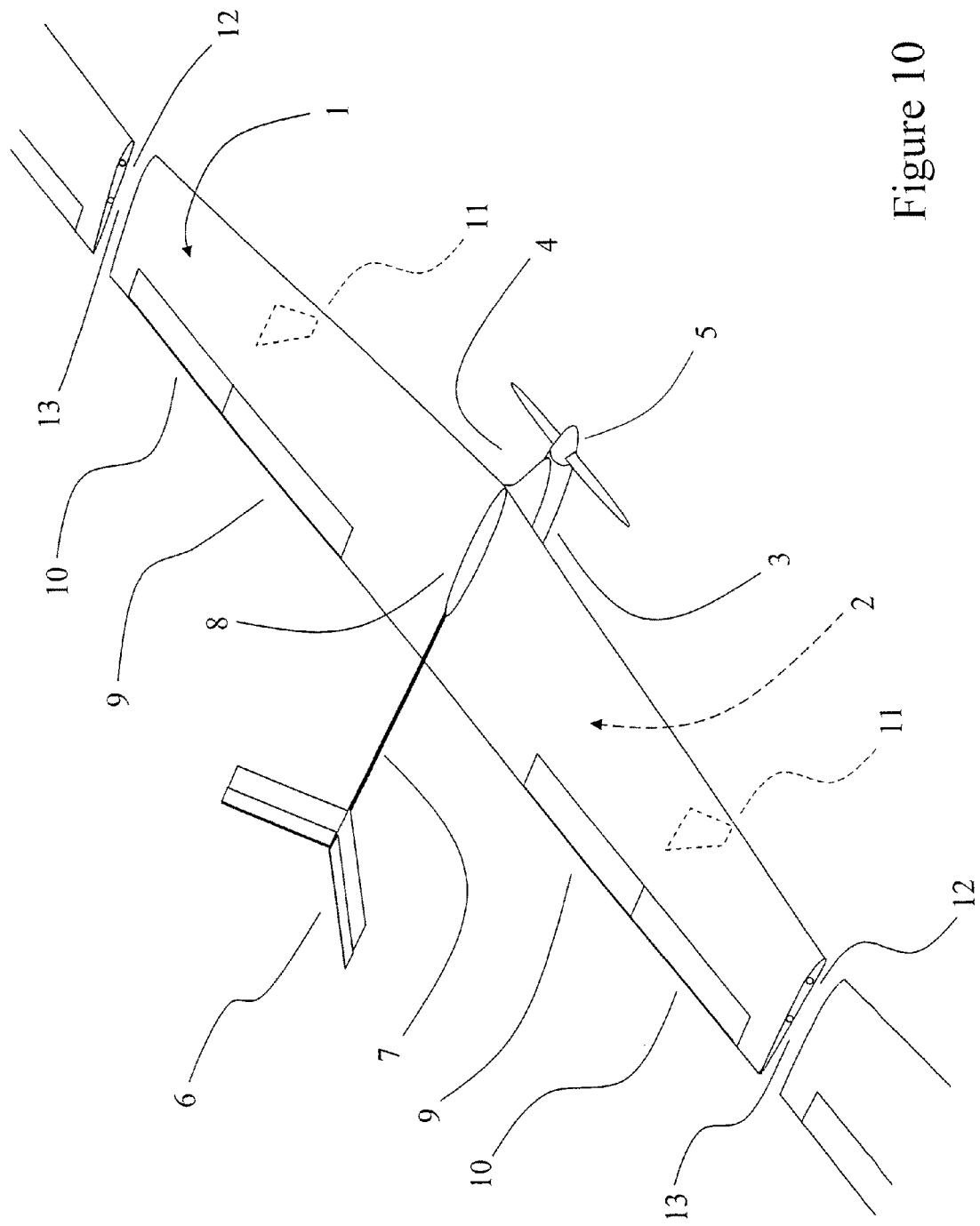
FIG. 10 sets forth a perspective view of an element of the modular articulated-wing aircraft in a preferred embodiment (e.g. one of the flyers comprising a skybase)

FIG. 10 illustrates a preferred arrangement of a skybase flyer. The flyer is of conventional configuration, with wings, fuselage, propeller, and empennage. The entirety of the upper wing surface 1 is covered with an embedded and laminar photovoltaic array. The lower wing surface 2 forms the mounting surface for an antenna array, either for communications, surveillance, signals intelligence, or the like.

A preferred embodiment of the current invention incorporates a surveillance sensor (not shown). A surveillance sensor for a span-loaded aircraft is itself ideally distributed across the wingspan. This avoids high point loads that could lead to catastrophic structural failure. Furthermore, in the solar-electric case of a preferred embodiment, very little electrical power is available for the sensor. This results in the favoring of passive as opposed to active sensors, for example using passive radiometry. It is also possible to incorporate a dual-mode passive sensor system, such as one using both radiometers (which can penetrate clouds) and combined electro-optical and infrared sensors (which cannot, but which have higher sensitivities than radiometers).

In a preferred embodiment, the surveillance sensor integrated into each flyer is comprised of an electronically-scanned antenna array installed in the lower surface of the wing 2, along with associated processing hardware. As an augmentation in an alternative embodiment, a lightweight electro-optical and infrared sensor can be installed in the fuselage 3 of each flyer. The processing architecture is decentralized to the maximum practical extent, to minimize weight concentrations and to ease cooling issues such as may exist. Each flyer has an individual capability to form an electronic beam, allowing image formation to a resolution limit imposed by the wingspan of the flyer (and, to a lesser extent, the overall length of the flyer). Images may be formed interferometrically, if sparse arrays are called for by dint of the weight and power limitations of a preferred embodiment, or may rely on fully-populated phased arrays. Antenna elements can be placed, for example, along the tail boom 7 of each flyer to extend the length of each array; may be placed at the end of extensible poles mounted in a "stinger" position; or may be towed on a drogue behind the flyer.

To enable image forming, a real-time calibration of the antenna array is performed, so as to compensate for the effects of wing flexing or drogue position errors. This is done using the techniques of optical interferometry, either on fiber optics placed inside the aircraft structure, or using lasers in free-space.

In forming a skybase, each flyer performs a rendezvous and docks with one or more other flyers. The architecture of the sensor system is such that, on docking, the individual antenna arrays are linked in function to enable image forming at higher resolution, taking advantage of the increased wingspan. As the ever-larger skybase ascends to its progressively-increasing equilibrium altitude, resolution at the ground target is maintained (or even increased) by virtue of the larger antenna size. Conversely, if individual flyers separate from the skybase, the diminished skybase normally descends to a lower equilibrium altitude and sensor angular resolution is reduced (due to its now-shorter wingspan)—but resolution at the ground is maintained due to the lower line-of-sight slant range to the target. Meanwhile, the detached flyer or flyers can proceed under their own power to a remote operating location, at a lower altitude and perhaps under a cloud cover, and retain the capability to image targets with their individual sensor arrays.

Skybase flyers communicate with each other while separated via a wireless intranet, but communication may be limited to upper-level functionality (system status, relative position, and task allocation) because of bandwidth constraints. In certain example embodiments, there is no need to pass any level of processed imagery between flyers.

When compounded into a single, articulated structure, linked flyers can communicate with each other via fiber-optics. Inter-flyer optical data transfer can be conducted by locating lenses at the flyer wingtips, at a terminus of each flyer's fiber-optical data bus. When flyers are connected, lenses oppose lenses, wingtip to wingtip, and optical data is passed across a few inches of free-space. Consequently, flyers can dock together while avoiding the need for mechanical data bus interconnections and their associated complexity. In this case, very high bandwidth is possible, and image formation is enabled using the entire span of the skybase, however many flyers are connected.

Returning to FIG. 10, the flyer fuselage 3 is suspended from the flyer wing by a pylon 4. Location of the fuselage below the wing serves to provide a natural restoring force that opposes flapping motions of those flyers at the outboard stations of the skybase, thereby relieving requirements levied on any anti-flapping modes of the skybase flight control system. A suspended fuselage location also facilitates launch and recovery of the flyer from an airfield, elevating the wing off the ground, and allowing some banking into a crosswind if necessary without fear of catching the wing and cart-wheeling. The underside of the fuselage has hard points fore and aft to allow the flyer to rest in a launch dolly. A retractable skid is faired into the underside of the fuselage for airfield landings. A small wheel for taxiing purposes is located either side of the skid. Within the fuselage 3 and pylon 4 are located a battery pack (either summer-weight or winter-weight); an electronic controller module to provide energy conditioning and management; an electric motor for propulsion; a reduction gearbox driven by the motor that drives the propeller 5; a flight avionics package including communications and navigation equipment and a flight control system; and a mission avionics package containing a central processor for the antenna array fitted to the undersurface of the wing 2. In an alternative embodiment, an electro-optical and infrared surveillance sensor comprising a camera and turret is also fitted in the fuselage 3.

Figure 12:
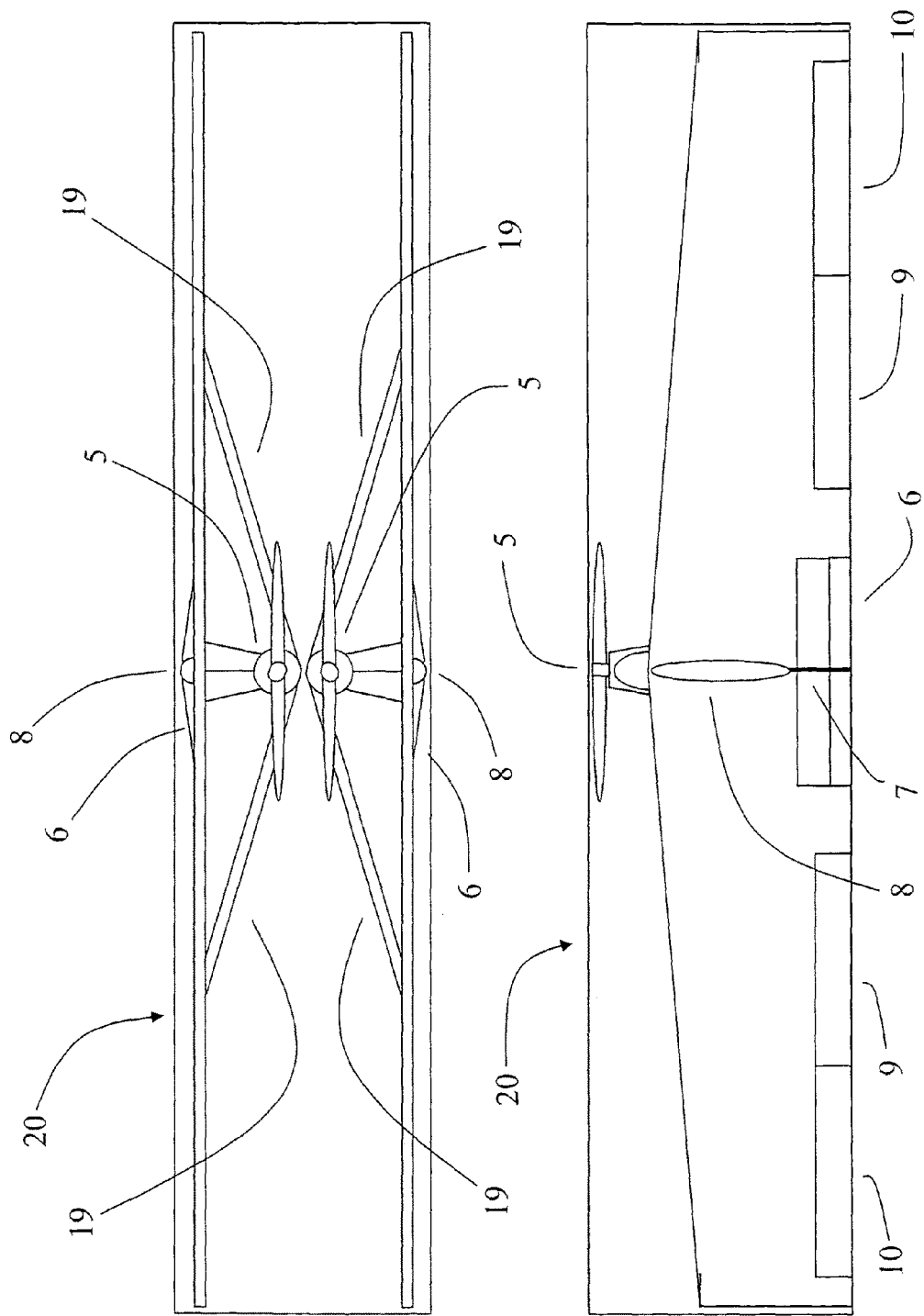
FIG. 12 shows an exemplary arrangement of two flyers packaged into a standard 40-foot shipping container.

A vee-tail empennage (tail 6) is attached to each flyer by a tail boom 7. This tail boom extends from a center-wing fairing 8. A preferred embodiment of the flyer design includes a tail surface to improve control authority in pitch of each flyer when flying as a single unit in the lower atmosphere. The tail also provides a pitch control surface that is decoupled from flapping motion when the flyer is a connected element of a skybase. The design of the tail collapses for shipment of each flyer in a standard cargo container or in the cargo bay of a transport aircraft. The sequence is as follows: tail 6 folds flat, forming a surface parallel to the upper wing surface 1. Tail 6 and tail boom 7 then slide as a unit into center-wing fairing 8. In stowed configuration, the trailing edge of tail 6 is coincident with the trailing edge of the upper wing surface 1, as can be seen in FIG. 12.

The center-wing fairing 8 also includes an attachment point for a parachute system. This parachute system comprises a sequentially-opened drogue parachute and main parachute, and is used for extraction of the flyer from a transport aircraft, in the case of air-deployment as previously described.

Inboard flaperons 9 and outboard flaperons 10 provide control authority in roll (motion about the longitudinal axis) for a flyer operating as an individual unit. For landing and takeoff, flaperons 9 are used as conventional flaps, and flaperons 10 are used as conventional ailerons. When the flyer is connected to other flyers, the function of these control surfaces changes. Flaperon actuation must be coordinated between flyers, using their networked flight control systems. The flaperons 9 and 10 become flapping-dampers, serving to damp flapping motions between adjacent flyers. When flaperons 9 are deflected in opposition to flaperons 10 across a semi-span of the skybase, a yawing moment is generated about the vertical axis of the skybase. When this action is combined with a downward deflection of the elevator at the trailing edge of the tail 6 of each flyer across that same semi-span, the entire skybase performs a coordinated turn in that direction. The elevators of the flyers become elevons when the flyers are linked into a skybase.

Suspended beneath each flyer wing is a retractable side-force controller 11. The side-force controllers 11 are located at the fore-and-aft location of the flyer center of gravity, and thus are capable of imparting force along the lateral axis of the flyer without the generation of any unwanted yawing moment. The side-force controllers 11 impart this force by rotation about their vertical axes. The purpose of these control surfaces is to allow flyers to rendezvous and dock in as simple a manner as possible. Conventional aircraft control surfaces would demand that the flyers close intervening gaps by rolling towards each other by aileron control, or alternatively, skidding towards each other with rudder control. In both cases, rotational motions would be developed that are not conducive to a rendezvous and mechanical docking. Provision of side-force controllers 11 enables a direct lateral translation that is not otherwise possible. Direct lateral translation minimizes the chance that one flyer could blunder into the trailing wingtip vortices generated by the other during a tip-docking maneuver.

Side-force controllers 11 are mounted to the lower wing surface 2 since mounting on the upper wing surface 1 would tend to reduce the wing surface available to the photovoltaic array. Mounted beneath the wing, they can also double as skids to protect the lower wing surface 2 during landing. They are retractable into the lower wing surface 2 in order to reduce aerodynamic drag when not in use.

FIG. 10 depicts a front ball 12 and a rear ball 13. These balls are fitted to the starboard flyer wingtips in the preferred embodiment, and are part of the inter-flyer connection and articulation mechanism that is fully illustrated by FIG. 13.

Figure 11:
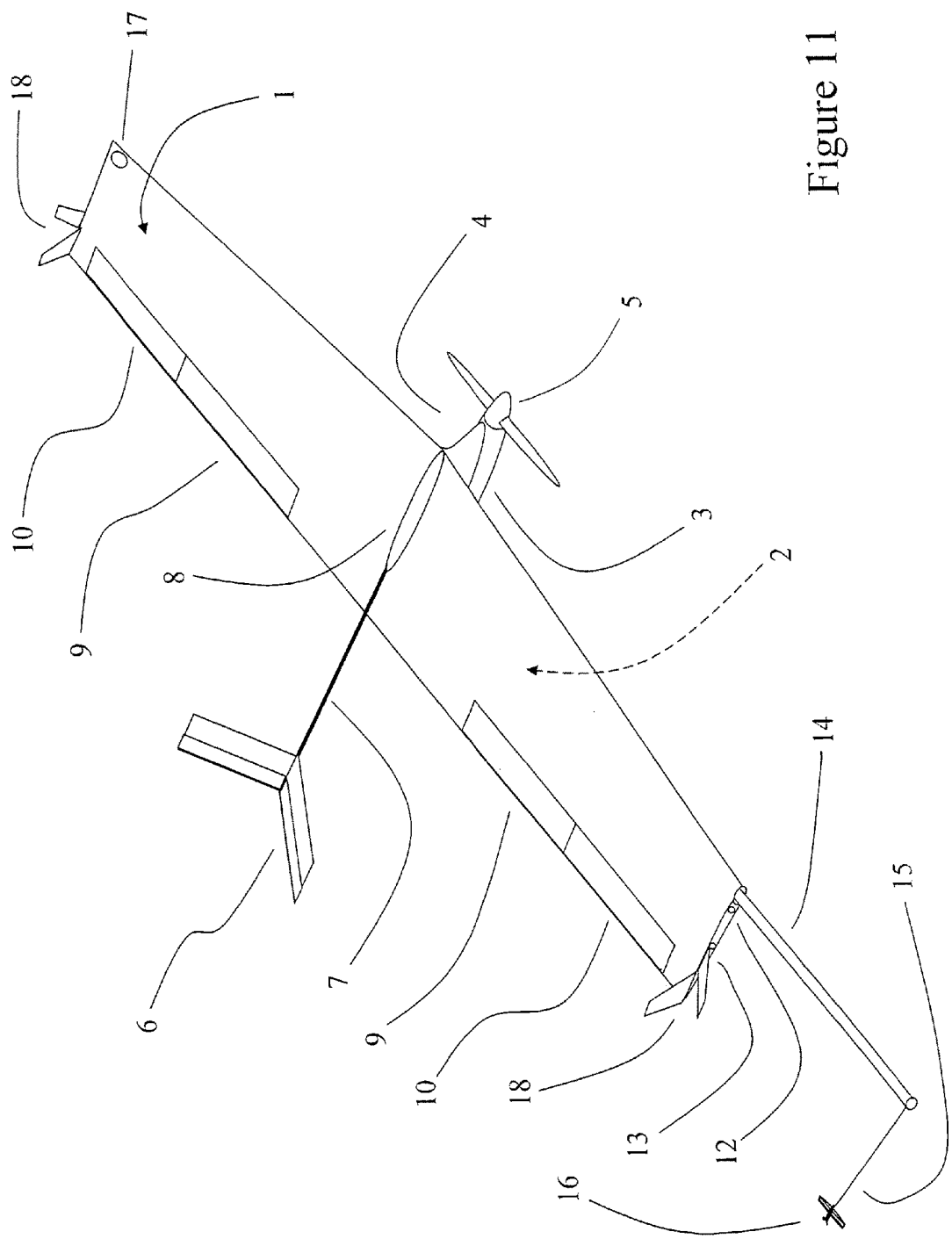
FIG. 11 depicts an alternative exemplary embodiment of the skybase flyer, showing mechanical and aerodynamic aids to tip-docking.

A reliable method of aggregating flyers into a skybase is crucial from an operational perspective. The rendezvous and docking system may need to function in turbulent air, at any time of day or night. The preferred embodiment of the current invention involves a flyer performing a rendezvous to a line abreast pre-docking position. Gross navigation to this position is performed by a pseudolite-based Global Positioning System receiver and transmitter set. The final docking maneuver is conducted with the aid of side-force controllers 11 as described above. The relative position of one flyer with respect to another in the final docking phase is determined by a short-range ladar system. In turbulent air, however, it may be difficult to reliably tip-dock flyers, and a more robust means of closing the gap may be required. FIG. 11 depicts an alternative embodiment of the skybase flyer design, showing mechanical and aerodynamic aids to tip-docking. FIG. 11 depicts a handedness that can be reversed in an alternative embodiment without any effect on fit or function. In a preferred embodiment, a boom 14 telescopes out from a flyer's starboard wing. A controllable drogue 16 is paid out on a line 15 passing over a small pulley at the tip of the boom 14. A second flyer approaches the first flyer from behind, offset so as to line up an electromagnetic receiver pad on its port wing behind the drogue 16 being trailed by the first flyer. The typical location of the receiver pad is shown in 17. The drogue 16 makes contact with the receiver pad, whereupon an electric current is applied to the pad so as to capture the drogue 16 electromagnetically. At that point, the line 15 is hauled in as the two flyers adjust their airspeeds to provide a closing velocity. Eventually the two flyers are in line abreast, and the first flyer's boom 14 locks into a slot in the forward port wingtip of the second flyer. The boom 14 is then retracted into the wing of the first flyer, guiding the wingtips of the two flyers together for a final connection (depicted in FIG. 13 below).

A possible disadvantage of the alternative embodiment described above is that one flyer must trail the other, albeit to one side. It is conceivable that in the pre-docking positioning, the trailing flyer could blunder into the trailing vortex being shed by the wingtip of the lead flyer, and suffer a roll upset that would be difficult to recover from without the loss of significant altitude. Vortex controllers 18 are consequently fitted to the wingtips of each flyer in an alternative embodiment. These aerodynamic surfaces have a limited capability to influence the lateral spreading and core strength of the trailing tip vortices.

FIG. 12 shows the arrangement of two flyers packaged into a standard 40-foot shipping container 20. The empennage 6 and tail boom 7 of each flyer are shown in the stowed state— that is, with empennage 6 folded flat and tail boom 7 retracted into center-wing fairing 8. A flyer propeller 5 is shown with its spinner removed for shipping. The flyers are shown with transport struts 19 installed. These struts prevent damage to the relatively fragile flyers during shipping, and are removed when the flyers are prepared for flight at a launch base. If a flyer is to be air-launched by parachute extraction from a transport aircraft, the transport struts 19 are left in place to be jettisoned once the flyer is pulled clear and is suspended from its main parachute. This ensures that the fragile flyer survives the mechanical shock associated with parachute extraction.

Figure 13:
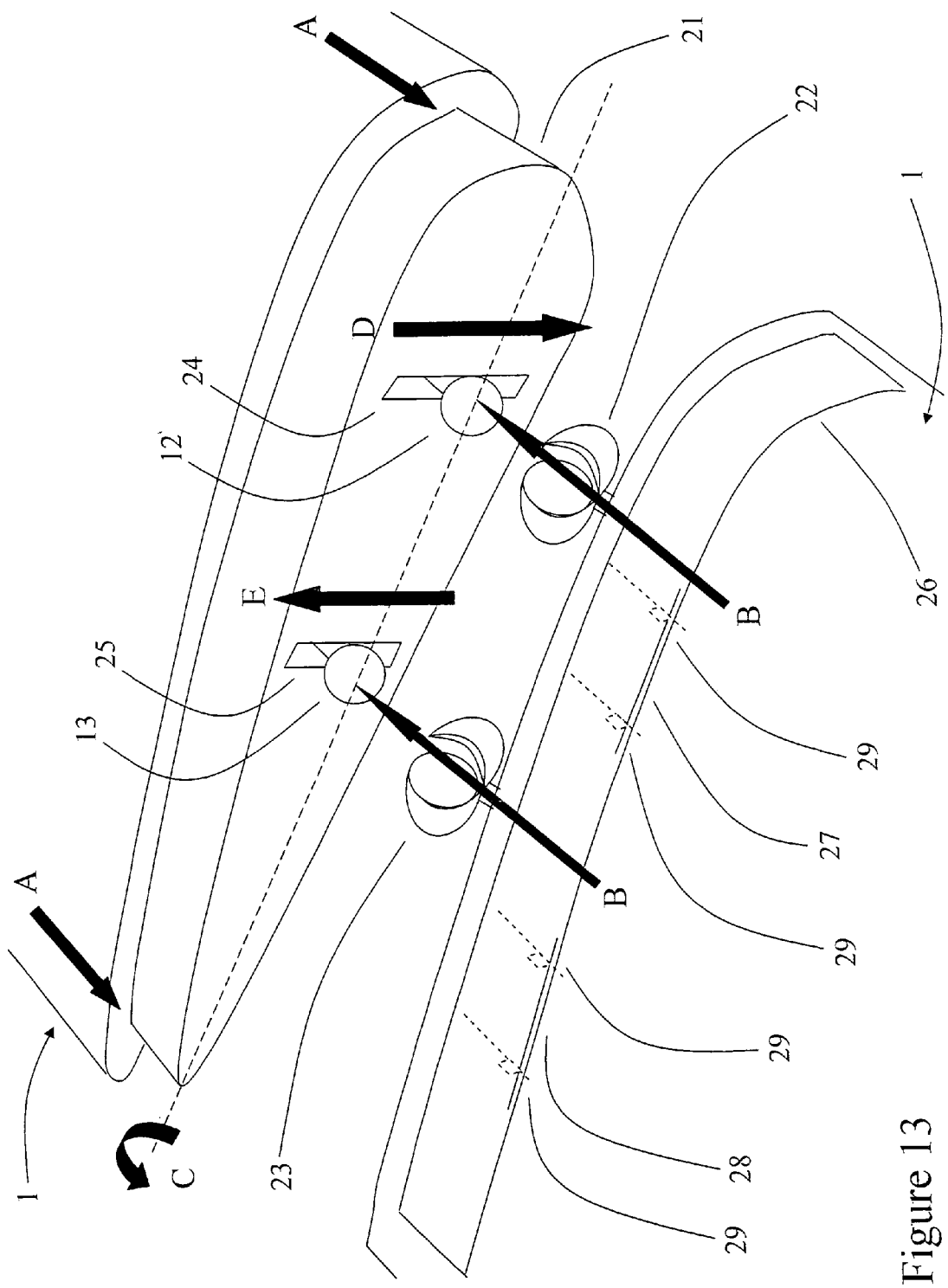
FIG. 13 illustrates a preferred embodiment of the skybase connection and articulation mechanism.

FIG. 13 illustrates a preferred embodiment of the skybase connection and articulation mechanism. This figure depicts a handedness that can be reversed in an alternative embodiment without any effect on fit or function. The connection and articulation mechanism is very simple and lightweight compared to the equivalent mechanisms found in the prior art, such as those designed for use in Projects Tip Tow and Tom Tom in the 1950s. This is because the skybase flyers are themselves light and, as a result, correspondingly low forces are applied to the mechanism during docking and connected flight.

In an exemplary embodiment, as two flyers commence their final docking sequence, a hinge carrier 21 slides out from the starboard wingtip of one flyer in the direction A. A front ball 12 and a rear ball 13 are incorporated in the hinge carrier 21. These balls have vertical freedom of movement while otherwise restrained in a forward vertical slot 24 and a rear vertical slot 25. As the port wingtip of a second flyer approaches the starboard wingtip of the first in the direction B, a front socket 22 and a rear socket 23 extend from the aforesaid port wingtip, and open so as to receive ball 12 and ball 13. The balls and sockets make contact, and the sockets 22 and 23 are commanded to the closed position. At this point, the hinge carrier 21 is retracted back into the wingtip of the first flyer. Finally, a gap seal 26 attached to the upper surface of the port wing 1 of the second flyer is extended. The gap seal 26 traverses along trackways 29. Once fully extended over the now-connected articulation mechanism, the gap seal 26 is free to flex about its front hinge 27 and its rear hinge 28.

Once engaged, the inter-flyer connection mechanism accommodates a flapping motion about the longitudinal hinge axis. The sense of motion depicted by C represents a wing droop. The connection mechanism also accommodates variation in the relative pitch of flyers with respect to their lateral axes. If the second flyer as shown is outboard of the first flyer as shown, and both are connected in a skybase assembly, a deflection in the direction D of the forward ball and socket joint comprising 12 and 22, when combined with a deflection in the direction E of the rear ball and socket joint comprising 13 and 23, results in a geometric washout of that semi-span of the skybase wing.

Figure 14:
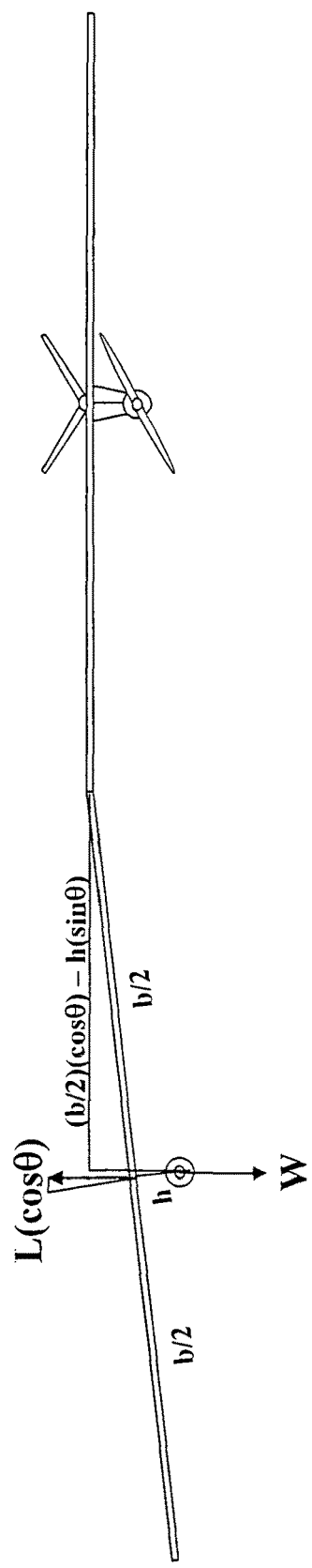
FIG. 14 shows the restoring moment acting about the flapping axis of two connected flyers where one flyer is at the outside of the skybase; and, FIG. 15 shows actual outboard wingtip effects that result in an asymmetric lift distribution.

FIG. 14 shows the restoring moment acting about the flapping axis of two connected flyers where one flyer is at the outside of the skybase. The following equation represents the net moment:

$$\text{Net Moment} = L\left(\frac{b}{2}\right)(\cos\theta) - \left[W\left(\frac{b}{2}\right)(\cos\theta) - Wh(\sin\theta)\right] = Wh(\sin\theta)$$

Here, L is lift, W is weight, b is the flyer wingspan, h is the vertical separation of the fuselage from the wing, and θ is the flapping angle. It will be appreciated that the net restoring moment is linear with h, and so from this consideration at least, it is desirable to suspend the flyer's fuselage from its wing. This calculation assumes a symmetric lift distribution across the flyer's wing.

Figure 15:
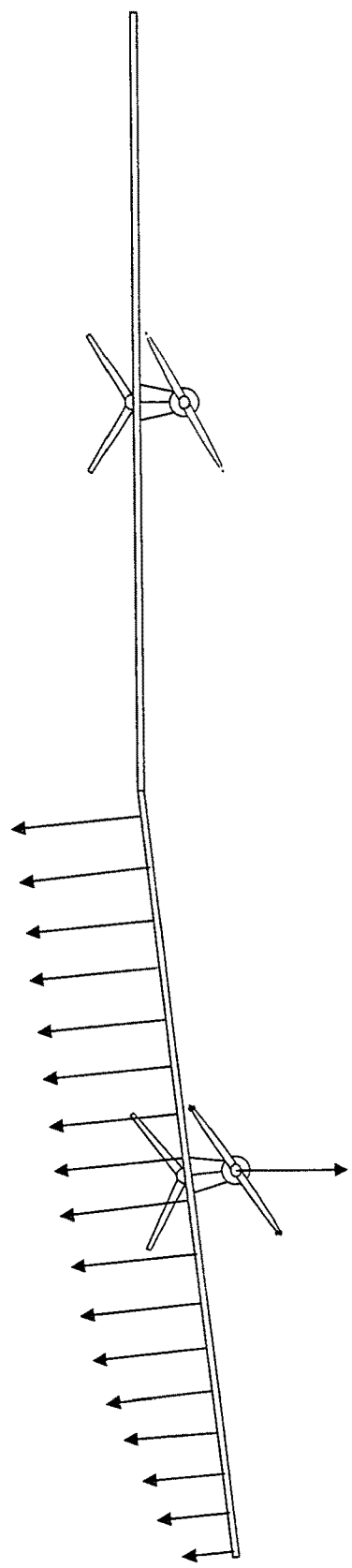

FIG. 15 shows actual outboard wingtip effects that result in an asymmetric lift distribution. In actuality, outboard wingtip effects will result in an asymmetric lift distribution that will in turn cause a static droop of the outboard flyer. This droop can be countered with flaperon deflection, although at the cost of some trim drag. Lowering the flyer's center of gravity will also reduce static droop. However, the droop effect can be beneficial, since as a result, two flyers that separate will tend to fly apart rather than together, thus reducing the chance of a collision.

It is interesting to note that this flapping system is an undamped oscillator. It may be necessary to damp flapping motions with either flight control system inputs or by use of a mechanical damping device. The former may be preferable, since the latter would involve a weight penalty.

It will be appreciated that the flapping hinge is not fixed in space. Each flyer's electric motor will impart a torque about the wingtip hinge mechanism, and the effect will be most pronounced for the outboard flyers of a skybase. This is actually a positive feature, as motor torque variation can be used in concert with flight control surfaces to manage the structural dynamics of the skybase assemblage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An autonomous modular flyer operable to loiter over an area of interest at a first high altitude, comprising:
an airborne object including two wings, each wing having a wingtip with a hinge thereon, each wingtip being operably joinable to another autonomous modular flyer's wingtip to form an aggregation when a first predetermined condition is met, and being operably disaggregable from the other autonomous modular flyer's wingtip when a second predetermined condition is met;
wherein the aggregation a is a multiple-articulated flying system having a high aspect ratio wing platform, operable to loiter over the area of interest at an altitude at least as high as the first high altitude; and
wherein a gap seal is arranged to cover the hinges on upper and lower wing surfaces when two wingtips are joined, the gap seal having a geometric constraint for accommodating up to a fixed amount of flapping between adjacent autonomous modular flyers before the hinges allow separation thereof.

2. The autonomous modular flyer of claim 1, the autonomous modular flyer is further operable to match its airspeed with a prevailing headwind and/or to make large orbits.

3. The autonomous modular flyer of claim 1, wherein the autonomous modular flyer has an altitude ceiling in Earth's stratosphere and/or structural robustness in Earth's troposphere.

4. The autonomous modular flyer of claim 1, wherein aggregations of larger numbers of modular flyers occur at sequentially higher altitudes.

5. The autonomous modular flyer of claim 1, wherein the second predetermined condition includes one or more of: a loading event above a given load threshold, a gust above a gust threshold, a turn of the multiple-articulated flying system, a span shear above a span shear threshold, an instruction for at least one of the modular flyers to undertake a remote surveillance activity, and an instruction for at least one of the modular flyers to move closer to the area of interest.

6. The autonomous modular flyer of claim 1, wherein the multiple-articulated flying surface system of claim 1 is operable to reaggregate based at least on a third predetermined condition.

7. The autonomous modular flyer of claim 6, wherein the third predetermined condition includes one or more of: a second predetermined condition that previously was met no longer is met, and at least one modular flyer being destroyed, recalled, and/or no longer functional.

8. The autonomous modular flyer of claim 1, further comprising insolation circuitry to power each modular element and/or the multiple-articulated flying system.

9. The autonomous modular flyer of claim 8, wherein the insolation circuitry comprises a photovoltaic array, an electronic controller to condition and manage the power, and an electrical energy storage mechanism.

10. The autonomous modular flyer of claim 1, further comprising a flight controller operable to calculate an equilibrium ceiling altitude and to instruct the autonomous modular flyer to climb or descend to the equilibrium ceiling altitude.

11. The autonomous modular flyer of claim 1, further comprising a sensor operable to gather data relating to the area of interest.

12. The autonomous modular flyer of claim 11, wherein the sensor is further operable to work as an element in a sensor array when a multiple-articulated flying system is formed.

13. The autonomous modular flyer of claim 1, wherein the flapping is allowed to take place along a flapping axis of two connected autonomous modular flyers in accordance with a net moment modeled by:

$$\text{Net Moment} = L\left(\frac{b}{2}\right)(\cos\theta) - \left[W\left(\frac{b}{2}\right)(\cos\theta) - Wh(\sin\theta)\right] = Wh(\sin\theta)$$

wherein L is lift, W is weight, b is the flyer wingspan, h is the vertical separation of the fuselage from the wing, and θ is the flapping angle, assuming a symmetric lift distribution across the flyer's wing.

14. A method of forming a multiple-articulated flying system having a high aspect ratio wing platform, operable to loiter over an area of interest at a high altitude, the method comprising:
providing at least two autonomous modular flyers, each having two wings with wingtips thereon, each wingtip having a hinge; and,
joining the wingtips of the at least two autonomous modular flyers when a first predetermined condition is met;
wherein a gap seal is arranged to cover the hinges on upper and lower wing surfaces when two wingtips are joined, the gap seal having a geometric constraint for accommodating up to a fixed amount of flapping between adjacent autonomous modular flyers before the hinges allow separation thereof.

15. The method of claim 14, further comprising disaggregating the wingtips of the at least two autonomous modular flyers when a second predetermined condition is met.

16. The method of claim 15, further comprising re-aggregating disaggregated autonomous modular flyers.

17. The method of claim 14, further comprising matching the multiple-articulated flying system's airspeed with a prevailing headwind and/or making large orbits in order to loiter over the area of interest.

18. The method of claim 14, further comprising powering the autonomous modular flyers and/or the multiple-articulated flying system by using solar-electric energy.

19. The method of claim 14, further comprising calculating an equilibrium ceiling altitude for the autonomous modular flyer, and altering the autonomous modular flyer's altitude to the equilibrium ceiling altitude.

20. The method of claim 14, further comprising calculating an equilibrium ceiling altitude for the multiple-articulated flying system, and altering the multiple-articulated flying system's altitude to the equilibrium ceiling altitude.

21. The method of claim 14, further comprising sensing data related to the area of interest.

22. The method of claim 21, further comprising when a multiple-articulated flying system is formed, sharing data between sensors of modular flyers and/or using individual sensors of modular flyers as elements in a sensor array.

23. The method of claim 14, wherein the flapping is allowed to take place along a flapping axis of two connected autonomous modular flyers in accordance with a net moment modeled by:

$$\text{Net Moment} = L\left(\frac{b}{2}\right)(\cos\theta) - \left[W\left(\frac{b}{2}\right)(\cos\theta) - Wh(\sin\theta)\right] = Wh(\sin\theta)$$

wherein L is lift, W is weight, b is the flyer wingspan, h is the vertical separation of the fuselage from the wing, and θ is the flapping angle, assuming a symmetric lift distribution across the flyer's wing.

* * * * *